US012703636B2

(12) United States Patent
Nakama et al.

(10) Patent No.: US 12,703,636 B2
(45) Date of Patent: Aug. 11, 2026

(54) GAS PRODUCTION DEVICE, GAS PRODUCTION SYSTEM AND GAS PRODUCTION METHOD

(71) Applicant: SEKISUI CHEMICAL CO., LTD., Osaka (JP)

(72) Inventors: Yuki Nakama, Ibaraki (JP); Rasika Dasanayake Aluthge, Ibaraki (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 544 days.

(21) Appl. No.: 18/019,554

(22) PCT Filed: Aug. 4, 2020

(86) PCT No.: PCT/JP2020/029817

§ 371 (c)(1),
(2) Date: Feb. 3, 2023

(87) PCT Pub. No.: WO2022/029881

PCT Pub. Date: Feb. 10, 2022

(65) Prior Publication Data

US 2024/0010500 A1 Jan. 11, 2024

(51) Int. Cl.
*C01B 32/40* (2017.01)

(52) U.S. Cl.
CPC ...... *C01B 32/40* (2017.08); *C01B 2210/0045* (2013.01)

(58) Field of Classification Search
CPC ......... C01B 32/00; C01B 32/40; C01B 32/50; C01B 2210/00; C01B 2210/0043; C01B 2210/0045
See application file for complete search history.

(56) References Cited

U.S. PATENT DOCUMENTS 9,327,986 B2 5/2016 Guyomarc'h
10,946,362 B1 3/2021 Kuhn et al.
(Continued)

FOREIGN PATENT DOCUMENTS

EP 2 634 140 9/2013
GB 1 246 483 9/1971
(Continued)

OTHER PUBLICATIONS

Office Action issued Jun. 4, 2024 in Japanese Patent Application No. 2020-132502, with English-language Translation.
(Continued)

*Primary Examiner* — Natasha E Young
(74) *Attorney, Agent, or Firm* — Wenderoth, Lind & Ponack, L.L.P.

(57) ABSTRACT

A gas production device and a gas production system capable of efficiently manufacturing a produced gas containing carbon monoxide from a raw material gas containing carbon dioxide are provided. The gas production device manufactures a produced gas containing carbon monoxide by bringing a raw material gas containing carbon dioxide into contact with a reductant that reduces the carbon dioxide. The device includes a connecting portion supplying the raw material gas, a reducing gas supply section supplying a reducing gas for reducing the reductant oxidized by contact with the carbon dioxide, a reaction section including a plurality of reactors, to which the connecting portion and the reducing gas supply section are respectively connected, and the reductant arranged in the reactors, and a concentration adjustment section provided between the connecting portion and the reactors and adjusting a concentration of oxygen contained in the raw material gas to less than 1% by volume.

7 Claims, 8 Drawing Sheets

(56) References Cited

U.S. PATENT DOCUMENTS

| | | | |
|---|---|---|---|
| 11,554,960 B2 * | 1/2023 | Dasanayake Aluthge .................. | B01J 19/2465 |
| 2011/0041517 A1 | 2/2011 | Takagi et al. | |
| 2014/0158030 A1 * | 6/2014 | Jadhav .................... | F23L 7/007 110/345 |
| 2014/0377158 A1 | 12/2014 | Andrus, Jr. et al. | |
| 2019/0282992 A1 | 9/2019 | Shekhawat et al. | |
| 2021/0009428 A1 | 1/2021 | Dasanayake Aluthge et al. | |

FOREIGN PATENT DOCUMENTS

| | | |
|---|---|---|
| JP | 2003-166013 | 6/2003 |
| JP | 2009-192125 | 8/2009 |
| JP | 2010-255087 | 11/2010 |
| JP | 2012-036029 | 2/2012 |
| JP | 2013-252987 | 12/2013 |
| JP | 2014-167146 | 9/2014 |
| JP | 2015-016467 | 1/2015 |
| JP | 5858926 | 2/2016 |
| KR | 2020-0055939 | 5/2020 |
| WO | 2009/079681 | 7/2009 |
| WO | 2012/017916 | 2/2012 |
| WO | 2012/050192 | 4/2012 |
| WO | 2019/163968 | 8/2019 |

OTHER PUBLICATIONS

Office Action issued Jun. 4, 2024 in Japanese Patent Application No. 2020-132503, with English-language Translation.

Office Action issued Jun. 4, 2024 in Japanese Patent Application No. 2020-132506, with English-language Translation.

International Search Report issued Oct. 6, 2020 in International (PCT) Application No. PCT/JP2020/029816.

International Search Report issued Sep. 29, 2020 in International (PCT) Application No. PCT/JP2020/029817.

International Search Report issued Oct. 6, 2020 in International (PCT) Application No. PCT/JP2020/029818.

International Search Report issued Oct. 27, 2020 in International (PCT) Application No. PCT/JP2020/029820.

International Search Report issued Oct. 27, 2020 in International (PCT) Application No. PCT/JP2020/029821.

Extended European Search Report issued Apr. 15, 2024 in European Patent Application No. 20948702.4.

Extended European Search Report issued Apr. 15, 2024 in European Patent Application No. 20948040.9.

Extended European Search Report issued Apr. 15, 2024 in European Patent Application No. 20948736.2.

Extended European Search Report issued Apr. 15, 2024 in European Patent Application No. 20948667.9.

Extended European Search Report issued Apr. 15, 2024 in European Patent Application No. 20948307.2.

Office Action issued Dec. 5, 2023 in Japanese Application No. 2020-132505, with English translation.

Office Action issued Dec. 5, 2023 in Japanese Application No. 2020-132504, with English translation.

* cited by examiner

GAS PRODUCTION DEVICE, GAS PRODUCTION SYSTEM AND GAS PRODUCTION METHOD

CROSS-REFERENCE TO RELATED APPLICATION

This application is a national stage application of International Patent Application No. PCT/JP2020/029817, now WO 2022/029881, filed on Aug. 4, 2020, the entire content of which is incorporated herein by reference.

TECHNICAL FIELD

The present invention relates to a gas production device, a gas production system, and a gas production method.

BACKGROUND ART

In recent years, the atmospheric concentration of carbon dioxide ($CO_2$), which is a kind of greenhouse gas, continues to increase. Increasing the concentration of carbon dioxide in the atmosphere contributes to global warming. Therefore, it is important to recover the carbon dioxide to be released into the atmosphere, and if the recovered carbon dioxide can be converted into a valuable substance and reused, a carbon recycling society can be realized.

Also, as a global measure, as stipulated in the Kyoto Protocol of the United Nations Framework Convention on Climate Change, the reduction rate of carbon dioxide, which causes global warming, in developed countries based on 1990 as a standard is set for each country. It is stipulated to jointly achieve the reduction target value within the commitment period.

In order to achieve the reduction target, exhaust gas containing carbon dioxide generated from ironworks, refineries, or thermal power plants is also targeted, and various technical improvements have been made to reduce carbon dioxide in these industries. One example of such technique is $CO_2$ capture and storage (CCS). However, this technique has a physical limit of storage and is not a fundamental solution.

In addition, for example, PTL 1 discloses a technique for converting carbon dioxide into a valuable substance. Specifically, a manufacture apparatus is disclosed that manufactures carbon monoxide from carbon dioxide using cerium oxide containing zirconium.

PRIOR ART DOCUMENTS

Patent Documents

Patent Document 1: Japanese Patent No. 5858926

SUMMARY OF INVENTION

Problem to be Solved by the Invention

However, according to the studies of the inventors, the invention described in PTL 1 is an invention that specifies a metal oxide that effectively converts carbon dioxide into carbon monoxide. PTL 1 discloses only conceptual or general information as shown in the drawings, even in terms of carbon monoxide manufacture conditions and manufacture apparatus. It was found that further technical improvements were necessary to industrially manufacture carbon monoxide.

Accordingly, an object of the present invention is to provide a gas production device (that is, an industrially advantageous manufacture apparatus), a gas production system, and a gas production method that can efficiently manufacture a produced gas containing carbon monoxide from a raw material gas containing carbon dioxide.

Means of Solving the Problem

Such objects are achieved by the present invention described below.

(1) A gas production device according to the present invention is a gas production device that brings a raw material gas containing carbon dioxide into contact with a reductant that reduces the carbon dioxide to manufacture a produced gas containing carbon monoxide, the apparatus including

- a raw material gas supply section that supplies the raw material gas,
- a reaction section that is connected to the raw material gas supply section and that includes at least one reactor storing the reductant, and
- a concentration adjustment section provided between the raw material gas supply section and the reactor and that adjusts a concentration of oxygen contained in the raw material gas,
- in which in the concentration adjustment section, the concentration of the oxygen contained in the raw material gas is adjusted to less than 1% by volume.

(2) In the gas production device according to the present invention, the concentration adjustment section preferably includes an oxygen removal apparatus that removes the oxygen contained in the raw material gas.

(3) In the gas production device according to the present invention, it is preferable that the reactor stores the reductant that produces the carbon monoxide by a reduction reaction of the carbon dioxide caused by contact with the raw material gas, and is capable of separating at least a part of oxygen atoms released from the carbon dioxide, in the reduction reaction system.

(4) In the gas production device according to the present invention, it is preferable that the at least one reactor includes a plurality of reactors that store a reducing agent containing a metal oxide that reduces carbon dioxide, as the reductant,

- the gas production device further has a reducing gas supply section that supplies a reducing gas containing a reducing substance that reduces the reducing agent oxidized by contact with the carbon dioxide, and
- each of the reactors is connected to at least one of the raw material gas supply section and the reducing gas supply section, where the raw material gas and the reducing gas to be supplied to each of the reactors are switchable or the reducing agent is movable between the reactors.

(5) It is preferable that the gas production device according to the present invention further includes a gas merging section that merges gases that have passed through the reactor to produce a mixed gas.

(6) The gas production device according to the present invention preferably further has gas lines independent from each other, which are connected to the respective reactors.

(7) In the gas production device according to the present invention, the metal oxide preferably contains at least one selected from metal elements belonging to the groups 3 to 12.

(8) The gas production system according to the present invention includes a raw material gas production section that produces a raw material gas containing carbon dioxide, and the gas production device according to the present invention, and is characterized in that the gas production device is connected to the raw material gas production section via the raw material gas supply section.

(9) A gas production method according to the present invention is a gas production method that brings a raw material gas containing carbon dioxide into contact with a reductant that reduces the carbon dioxide to manufacture a produced gas containing carbon monoxide, including preparing at least one reactor storing the reductant, and the raw material gas, bringing the raw material gas into contact with the reductant in the reactor to convert the carbon dioxide into the carbon monoxide, and in a case of recovering gas that passed through the reactor as it is, or by purifying the carbon monoxide from the gas that passed through the reactor, as the produced gas, the concentration of oxygen contained in the raw material gas is adjusted to less than 1% by volume prior to supply to the reactor.

(10) In the gas production method according to the present invention, it is preferable that the at least one reactor includes a plurality of reactors that store a reducing agent containing a metal oxide that reduces carbon dioxide, as the reductant, together with the plurality of reactors and the raw material gas, a reducing gas containing a reducing substance that reduces the reducing agent oxidized by contact with the carbon dioxide is prepared, and the raw material gas and the reducing gas are alternately brought into contact with the reducing agent in each of the reactors by switching the reactors to which the raw material gas and the reducing gas are supplied, to convert the carbon dioxide to the carbon monoxide and then reduce the oxidized reducing agent.

(11) In the gas production method according to the present invention, it is preferable that the gases after passing through the reactor are merged to produce a mixed gas, the mixed gas is recovered as it is or by purifying the carbon monoxide from the mixed gas, as the produced gas.

(12) In the gas production method according to the present invention, it is preferable that the gases after passing through the respective reactors are treated independently from each other.

Results of the Invention

According to the present invention, a produced gas containing carbon monoxide can be efficiently manufactured from a raw material gas containing carbon dioxide. In particular, since in the present invention, a concentration adjustment section that adjusts the concentration of oxygen contained in the raw material gas is provided, it is possible to deviate the gas composition of the raw material gas from the explosion range and prevent ignition of the raw material gas.

DESCRIPTION OF EMBODIMENTS

Hereinafter, the gas production device, the gas production system, and the gas production method according to the present invention will be described in detail based on preferred embodiments shown in the accompanying drawings.

Figure 1:
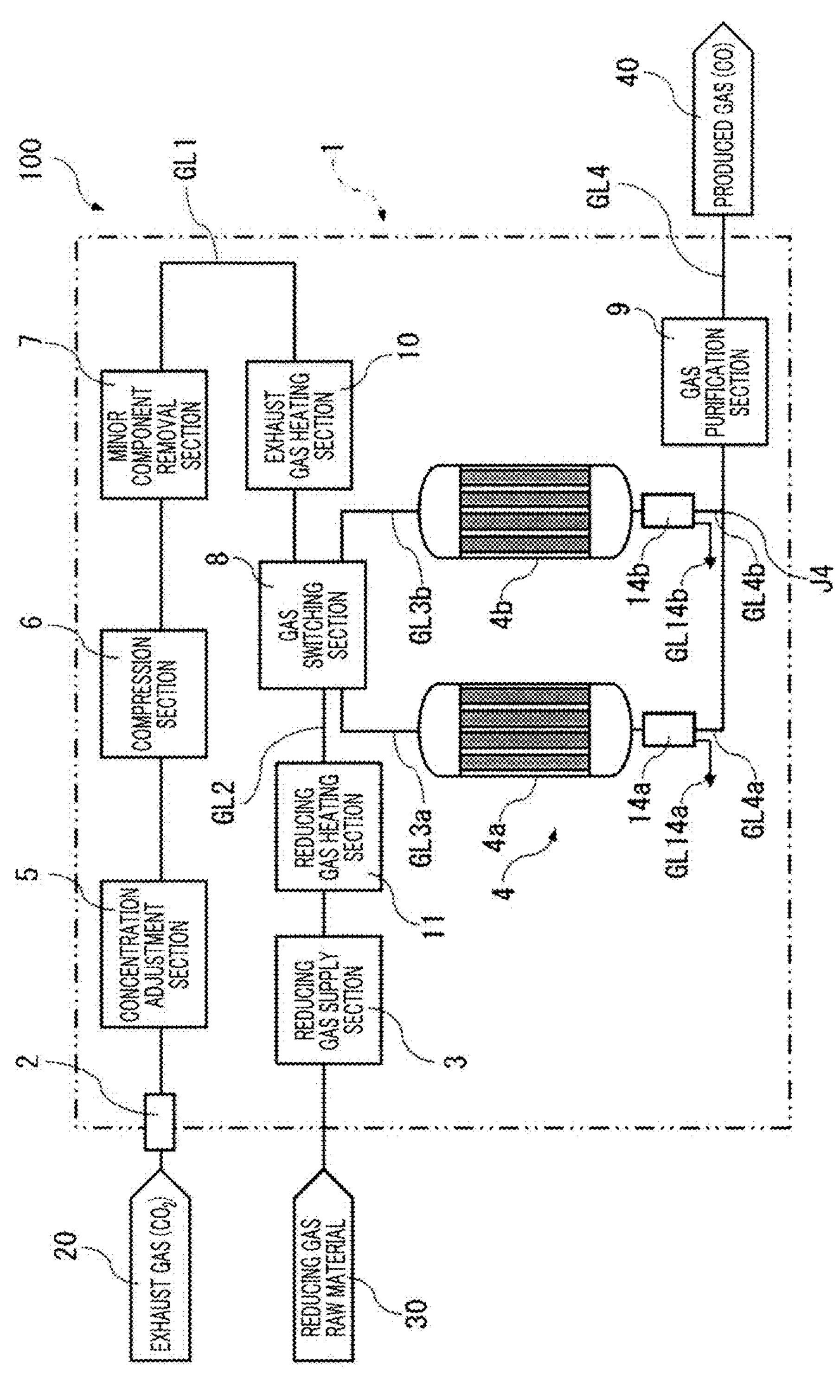
FIG. 1 is a schematic diagram showing one embodiment of the gas production system according to the present invention.
Figure 2:
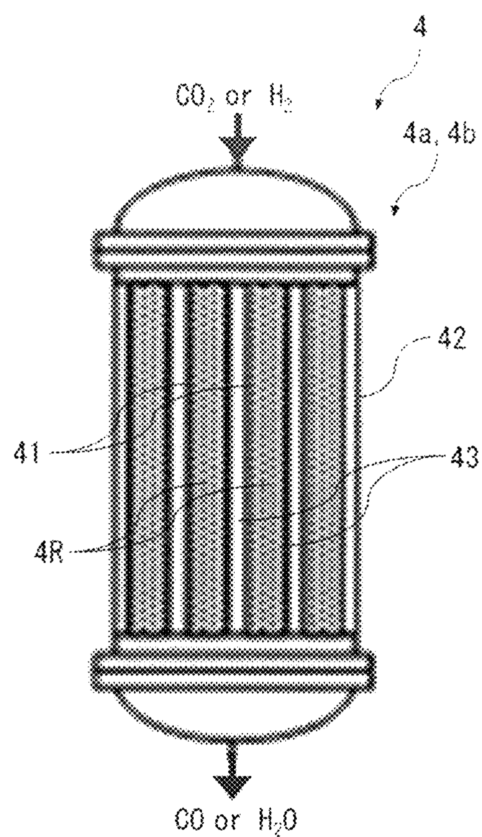
FIG. 2 is a cross-sectional view schematically showing a configuration (first configuration example) of the reactor of FIG. 1.
Figure 3:
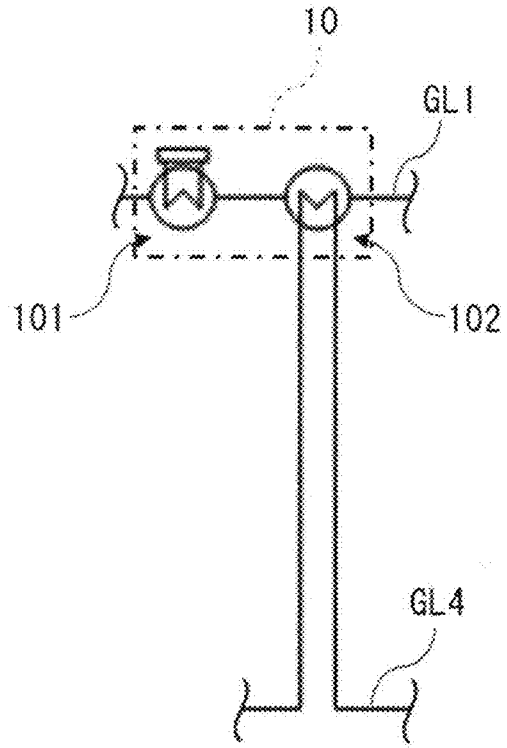
FIG. 3 is a schematic diagram showing a configuration of the exhaust gas heating section in FIG. 1.

FIG. 1 is a schematic diagram showing one embodiment of the gas production system according to the present invention, FIG. 2 is a cross-sectional view schematically showing the configuration (first configuration example) of the reactor of FIG. 1, and FIG. 3 is a schematic diagram showing the configuration of an exhaust gas heating section in FIG. 1.

The gas production system 100 shown in FIG. 1 includes a furnace (raw material gas production section) 20 that produces exhaust gas containing carbon dioxide (raw material gas) and gas production device 1 connected to the furnace 20 via connecting portion 2.

In this specification, the upstream side and the downstream side with respect to the gas flow direction are also simply referred to as the "upstream side" and "downstream side", respectively.

The furnace 20 is not particularly limited, but examples thereof include a furnace attached to an ironworks, a refinery, or a thermal power plant, preferably a combustion furnace, a blast furnace, a converter furnace, or the like. In the furnace 20, exhaust gas is produced (generated) during combustion, melting, refining, and the like of the contents.

In the case of a combustion furnace (incinerator) in a garbage incineration plant, examples of the contents (wastes) include plastic waste, kitchen refuse, municipal solid wastes (MSW), waste tires, biomass wastes, household refuse (bedding, papers), building materials, and the like. These wastes may contain one of these alone, or may contain two or more of these.

Exhaust gas typically contains, in addition to carbon dioxide, other gas components such as nitrogen, oxygen, carbon monoxide, water vapor, methane, and the like. The concentration of carbon dioxide contained in the exhaust gas is not particularly limited, but, considering the manufacture cost of the produced gas (conversion efficiency to carbon monoxide), is preferably 1% by volume or more, and more preferably 5% by volume or more.

Exhaust gas from a combustion furnace in a garbage incineration plant contains 5% to 15% by volume of carbon dioxide, 60% to 70% by volume of nitrogen, 5% to 10% by volume of oxygen, and 15% to 25% by volume of water vapor.

Exhaust gas from a blast furnace (blast furnace gas) is a gas generated when pig iron is manufactured in a blast furnace, and contains 10% to 15% by volume of carbon dioxide, 55% to 60% by volume of nitrogen, 25% to 30% by volume of carbon monoxide, and 1% to 5% by volume of hydrogen.

In addition, exhaust gas from a converter furnace (converter furnace gas) is a gas generated when steel is manufactured in the converter furnace, and contains 15% to 20% by volume of carbon dioxide, 50% to 60% by volume of carbon monoxide, 15% to 25% by volume of nitrogen, and 1% to 5% by volume of hydrogen.

However, if the exhaust gas is used as a raw material gas, carbon dioxide, which has conventionally been discharged to the atmosphere, can be effectively used, and the load on the environment can be reduced. Among these, from the viewpoint of carbon circulation, exhaust gas containing carbon dioxide generated in ironworks or refineries is preferable.

In addition, as the blast furnace gas and the converter furnace gas, the untreated gas discharged from the furnace may be used as it is. For example, a treated gas after being treated for removing carbon monoxide and the like, may be used. The untreated blast furnace gas and the untreated converter furnace gas have gas compositions as described above, and the treated gas has a gas composition close to that shown for the exhaust gas from the combustion furnace. In this specification, all of the above gases (the gases before being supplied to the gas production device 1) are called exhaust gas.

<Overall Configuration>

In the gas production device 1, an exhaust gas (a raw material gas containing carbon dioxide) discharged from a furnace 20 and supplied via a connecting portion 2 is brought in contact with a reducing agent containing a metal oxide that reduces the carbon dioxide contained in the exhaust gas to manufacture a produced gas (synthesis gas) containing carbon monoxide.

The gas production device 1 mainly includes a connecting portion 2, a reducing gas supply section 3, two reactors 4*a* and 4*b*, a gas line GL1 connecting the connecting portion 2 and the respective reactors 4*a* and 4*b*, a gas line GL2 connecting the reducing gas supply section 3 and the respective reactors 4*a* and 4*b*, and a gas line GL4 connected to the respective reactors 4*a* and 4*b*.

In this embodiment, the connecting portion 2 constitutes a raw material gas supply section that supplies the exhaust gas to the reactors 4*a* and 4*b*.

If necessary, a pump for transferring gas may be arranged at a predetermined position in the middle of the gas line GL1, the gas line GL2, and the gas line GL4. For example, in a case where the pressure of the exhaust gas is adjusted to be relatively low in the compression section 6, which will be described later, the gas can be smoothly transferred within the gas production device 1 by arranging a pump.

The gas line GL1 is connected to connecting portion 2 at one end thereof. On the other hand, the other end of the gas line GL1 is connected to inlet ports of the reactors 4*a* and 4*b* included in the reaction section 4 via a gas switching section 8 and two gas lines GL3*a* and GL3*b*, respectively.

With such a configuration, the exhaust gas supplied from the furnace 20 via the connecting portion 2 passes through the gas line GL1 and is supplied to the reactors 4*a* and 4*b*.

The gas switching section 8 can be configured to include, for example, a branch gas line and a channel opening/closing mechanism such as a valve provided in the middle of the branch gas line.

Each of the reactors 4*a* and 4*b* is, as shown in FIG. 2, constituted with a multi-tubular reaction apparatus (fixed bed type reaction apparatus) including a plurality of tubular bodies 41 each filled with a reducing agent (reductant) 4R, and a housing 42 storing the plurality of tubular bodies 41. According to such a multi-tubular reaction apparatus, sufficient opportunities for contact between the reducing agent 4R, and the exhaust gas and reducing gas can be ensured. As a result, the manufacture efficiency of the produced gas can be improved.

The reducing agent 4R according to this embodiment is, for example, preferably particulate (granulate), scaly, pellet-shaped, or the like. With such shape of the reducing agent 4R, the filling efficiency into the tubular body 41 can be improved, and the contact area between the reducing agent 4R and the gas supplied into the tubular body 41 can be further increased.

In a case where the reducing agent 4R is particulate, the volume average particle diameter of the reducing agent 4R is not particularly limited, but is preferably 1 to 50 mm and more preferably 3 to 30 mm. In this case, the contact area between the reducing agent 4R and the exhaust gas (carbon dioxide) can be further increased, and the conversion efficiency of carbon dioxide to carbon monoxide can be further improved. Similarly, the regeneration (reduction) of the reducing agent 4R by the reducing gas containing the reducing substance can be performed more efficiently.

The particulate reducing agent 4R is preferably a molded body manufactured by tumbling granulation because the sphericity is increased.

In addition, the reducing agent 4R may be supported on a carrier. The constituent material of the carrier is not particularly limited as long as it is difficult to modify depending on the exhaust gas (raw material gas), reaction conditions, and the like, and examples thereof include carbon materials (graphite, graphene, and the like), zeolite, montmorillonite, $SiO_2$, $ZrO_2$, $TiO_2$, $V_2O_5$, MgO, alumina ($Al_2O_3$), silica, and composite oxides of these materials. Among these, zeolite, montmorillonite, $SiO_2$, $ZrO_2$, $TiO_2$, $V_2O_5$, MgO, alumina ($Al_2O_3$), silica, and composite oxides of these materials are preferred. A carrier composed of such a material is preferable in that it does not adversely affect the reaction of the reducing agent 4R and is excellent in the ability to support the reducing agent 4R. Here, the carrier does not participate in the reaction of the reducing agent 4R and merely supports (holds) the reducing agent 4R. An example of such configuration includes a configuration in which at least a part of the surface of the carrier is coated with the reducing agent 4R.

The metal oxide (oxygen carrier) contained in the reducing agent 4R is not particularly limited as long as it can reduce carbon dioxide, but preferably contains at least one selected from metal elements belonging to the groups 3 to 12, more preferably contains at least one selected from metal elements belonging to the groups 4 to 12, even more preferably contains at least one of titanium, vanadium, iron, copper, zinc, nickel, manganese, chromium, cerium, and the like, and particularly preferably is metal oxides or composite oxides containing iron. These metal oxides are useful because the conversion efficiency of carbon dioxide to carbon monoxide is particularly excellent.

In addition, in each of the reactors 4*a* and 4*b*, the tubular body (circle-cylindrical molded body) 41 may be prepared from the reducing agent 4R (metal oxide) itself. Furthermore, a molded body that is a block-shaped or lattice-shaped (for example, net-shaped or honeycomb-shaped), or the like may be prepared from the reducing agent 4R and arranged in the housing 42. In these cases, the reducing agent 4R as a filler may be omitted or used together.

Among these, a configuration in which a net-shaped body is prepared from the reducing agent 4R and arranged in the housing 42 is preferable. In the case of such configuration, sufficient opportunities for contact between the reducing agent 4R, and the exhaust gas and reducing gas can be ensured, while preventing the passage resistance of the exhaust gas and the reducing gas from increasing in each of the reactors 4*a* and 4*b*.

The volumes of the two reactors 4*a* and 4*b* are set substantially equal to each other, and are appropriately set according to the amount of exhaust gas to be treated (the size of the furnace 20 and the size of the gas production device 1).

A concentration adjustment section 5, a compression section 6, a minor component removal section 7, and an exhaust gas heating section (raw material gas heating section) 10 are provided in this order from the connecting portion 2 side in the middle of the gas line GL1.

The concentration adjustment section 5 performs an adjustment to increase the concentration of carbon dioxide contained in the exhaust gas (in other words, concentrate the carbon dioxide). The exhaust gas also contains unnecessary gas components such as oxygen. By increasing the concentration of carbon dioxide contained in the exhaust gas in the concentration adjustment section 5, the concentration of unnecessary gas components contained in the exhaust gas can be relatively reduced. Therefore, it is possible to prevent or suppress the adverse effect of the unnecessary gas component on the conversion efficiency of carbon dioxide to carbon monoxide by the reducing agent 4R.

The concentration adjustment section 5 is preferably constituted by an oxygen removal apparatus that removes oxygen contained in the exhaust gas. Thereby, the amount of oxygen to be brought into the gas production device 1 can be reduced (that is, the concentration of oxygen contained in the exhaust gas can be adjusted to be low). For this reason, the gas composition of the exhaust gas can be deviated from the explosion range, and ignition of the exhaust gas can be prevented. Among the gas production device 1, since the oxygen removal apparatus consumes a large amount of electric energy, it is effective to use electric power as renewable energy as described later.

In this case, the concentration of oxygen contained in the exhaust gas is preferably adjusted to less than 1% by volume, more preferably less than 0.5% by volume, and even more preferably less than 0.1% by volume, with respect to the entire exhaust gas. Thereby, ignition of exhaust gas can be prevented more reliably.

Oxygen removal apparatus that removes oxygen contained in exhaust gas can be constituted by one or two or more of a low-temperature (deep cooling) separator, a pressure swing adsorption (PSA) separator, a membrane separation separator, and a temperature swing adsorption (TSA) separator, a chemical absorption separator, chemical adsorption separator, and the like.

In the concentration adjustment section 5, the concentration of carbon dioxide may be adjusted to be high by adding carbon dioxide to the exhaust gas.

The compression section 6 increases the pressure of the exhaust gas before being supplied to reactors 4*a* and 4*b*. This makes it possible to increase the amount of exhaust gas that can be treated at one time in the reactors 4*a* and 4*b*. Therefore, the conversion efficiency of carbon dioxide to carbon monoxide in the reactors 4*a* and 4*b* can be further improved.

Such compression section 6 can be constituted by, for example, a turbo compressor such as a centrifugal compressor and an axial-flow compressor, a volume compressor such as a reciprocation compressor (reciprocating compressor), a diaphragm compressor, a single-screw compressor, a twin-screw compressor, a scroll compressor, a rotary compressor, a rotary piston compressor, and a sliding vane compressor, a roots blower (two-lobe rotary blower) capable of operating at low pressure, a centrifugal blower, or the like.

Among these, the compression section 6 is preferably constituted by a centrifugal compressor from the viewpoint of ease of increasing the scale of the gas production system 100, and is preferably constituted by a reciprocation compressor from the viewpoint of reducing the manufacture cost of the gas production system 100.

The pressure of the exhaust gas after passing through the compression section 6 is not particularly limited, but is preferably 0 to 1 MPaG, more preferably 0 to 0.5 MPaG, and even more preferably 0.01 to 0.5 MPaG. In this case, the conversion efficiency of carbon dioxide to carbon monoxide in the reactors 4*a* and 4*b* can be further improved without increasing the pressure resistance of the gas production device 1 more than necessary.

The minor component removal section 7 removes minor components (a small amount of unnecessary gas components and the like) contained in the exhaust gas.

Such minor component removal section 7 can be constituted by, for example, at least one treater of a gas-liquid separator, a protector (guard reactor) and a scrubber (absorption tower).

In a case of using a plurality of treaters, their arrangement order is arbitrary, but in a case of using a gas-liquid separator and a protector in combination, it is preferable to arrange the gas-liquid separator on the upstream side of the protector. In this case, it is possible to further improve the efficiency of removing minor components from the exhaust gas, and extend the period of use (life) of the protector.

The gas-liquid separator separates, for example, condensed water (liquid) generated when the exhaust gas is compressed in the compression section 6 from the exhaust gas. In this case, unnecessary gas components and the like remaining in the exhaust gas are also dissolved and removed in the condensed water.

The gas-liquid separator can be constituted by, for example, a simple container, a swirl flow separator, a centrifugal separator, a surface tension separator, or the like. Among these, the gas-liquid separator is preferably constituted by a simple container because of its simple configuration and low cost. In this case, a filter may be arranged at the gas-liquid interface in the container to allow passage of gas but block passage of liquid.

Also, in this case, a liquid line may be connected to the bottom of the container, and a valve may be provided in the middle of the line. According to such configuration, the condensed water stored in the container can be discharged to the outside of the gas production device 1 via the liquid line by opening the valve.

The discharged condensed water may be reused by connecting the liquid line to a tank 30, which will be described later.

The exhaust gas from which the condensed water has been removed in the gas-liquid separator can be configured, for example, to be supplied to the protector.

Such protector preferably includes a substance capable of capturing a component that is a minor component contained in the exhaust gas and that reduces the activity of the reducing agent 4R by contact with the reducing agent 4R (inactivating component).

According to such configuration, when the exhaust gas passes through the protector, the substance in the protector reacts (captures) with the inactivating component to block or suppress the inactivating component from reaching the reducing agent 4R in the reactors 4*a* and 4*b*, and the reducing agent 4R can be protected (that is, prevented from reduction in activity). Therefore, an extreme decrease in the conversion efficiency of carbon dioxide to carbon monoxide by the reducing agent 4R due to the adverse effects of the inactivating component can be prevented or suppressed.

As such substance, a substance having a composition that is contained in the reducing agent 4R and that reduces the activity of the reducing agent 4R by contact with an inactivating component, specifically, metal oxides that are the same as or similar to the metal oxides contained in the reducing agent 4R can be used. Here, similar metal oxides refer to metal oxides that contain the same metal element but have different compositions, or metal oxides that contain different types of metal elements but belong to the same group in the periodic table.

The inactivating component is preferably at least one selected from sulfur, mercury, sulfur compounds, halogen compounds, organic silicones, organic phosphorus, and organic metal compounds, and more preferably at least one selected from sulfur and sulfur compounds. By removing such inactivating components in advance, rapid reduction in the activity of the reducing agent 4R can be effectively prevented.

The above-described substance may be any substance whose activity is reduced by the same component as the inactivating component of the reducing agent 4R, and is preferred in that metal oxides such as iron oxide and zinc oxide is excellent in capturing ability of the above-described inactivating component.

As the protector, a configuration in which a mesh material is arranged within a housing, and particles of the above-described substance are placed on the mesh material, and a configuration in which a honeycomb-shaped filter member or a circle-cylindrical or particulate molded body that is composed of the above-described substances is arranged within the housing can be employed.

In particular, in a case where a protector is arranged between the compression section 6 (gas-liquid separator) and the exhaust gas heating section 10, the removal efficiency of the inactivating components can be improved while preventing the above-described substances from deteriorating due to heat.

The exhaust gas heating section 10 heats the exhaust gas before being supplied to the reactors 4*a* and 4*b*. By heating the exhaust gas before reaction (before reduction) in the exhaust gas heating section 10 in advance, the conversion (reduction) reaction of carbon dioxide to carbon monoxide by the reducing agent 4R is further promoted in the reactors 4*a* and 4*b*.

The exhaust gas heating section 10 can be constituted by, for example, an electric heater 101 and a heat exchanger (economizer) 102 as shown in FIG. 3.

The heat exchanger 102 is configured to bend a part of the pipe that constitutes the gas line GL4 (see below) for discharging the gas (mixed gas) after passing through the reactors 4*a* and 4*b*, and to bring the part of the pipe close to the pipe that constitutes the gas line GL1. According to such configuration, the heat of the high-temperature gas (mixed gas) after passing through the reactors 4*a* and 4*b* is used to heat the exhaust gas before being supplied to the reactors 4*a* and 4*b* by heat exchange and thus effective use of heat can be achieved.

Such heat exchanger 102 can be configured as, for example, a jacket heat exchanger, an immersion coil heat exchanger, a double pipe heat exchanger, a shell and tube heat exchanger, a plate heat exchanger, a spiral heat exchanger, or the like.

In addition, in the exhaust gas heating section 10, either one of the electric heater 101 and the heat exchanger 102 may be omitted.

In the exhaust gas heating section 10, instead of the electric heater 101, a combustion furnace or the like can be used. However, if the electric heater 101 is used, electric power (electric energy) as renewable energy can be used as the power source for the electric heater 101, and thus the load on the environment can be reduced.

As renewable energy, electric energy obtained by using at least one selected from solar power generation, wind power generation, hydraulic power generation, wave activated power generation, tidal power generation, biomass power generation, geothermal power generation, solar heat, and geothermal heat can be used.

In addition, on the upstream side of the exhaust gas heating section 10 (for example, between the gas-liquid separator and the protector in the middle of the minor component removal section 7), the exhaust gas line is branched from the gas line GL1, and the vent portion provided outside the gas production device 1 may be connected to the end of the exhaust gas line.

In this case, a valve is preferably provided in the middle of the exhaust gas line.

If the pressure within the gas production device 1 (gas line GL1) rises more than necessary, a part of the exhaust gas can be discharged (released) from the vent portion via the exhaust gas line by opening the valve. As a result, the damage due to increase of the pressure in the gas production device 1 can be prevented.

One end of the gas line GL2 is connected to the reducing gas supply section 3. On the other hand, the gas line GL2 is connected to inlet ports of reactors 4*a* and 4*b* provided in the reaction section 4 via a gas switching section 8 and two gas lines GL3*a* and GL3*b*, respectively.

The reducing gas supply section 3 supplies a reducing gas containing a reducing substance that reduces the reducing agent 4R oxidized by contact with carbon dioxide. The reducing gas supply section 3 according to this embodiment is constituted by a hydrogen generation apparatus that generates hydrogen by electrolysis of water, and the hydrogen generation apparatus is connected to a tank (reducing gas raw material storage section) 30, in which water is stored, outside the gas production device 1. With such configuration, the reducing gas containing hydrogen (reducing substance) supplied from the hydrogen generation apparatus (reducing gas supply section 3) passes through the gas line GL2 and is supplied to the reactors 4*a* and 4*b*.

According to the hydrogen generation apparatus, a large amount of hydrogen can be produced relatively inexpensively and easily. In addition, there is also an advantage that the condensed water generated within the gas production device 1 can be reused. Among the gas production device 1, since the hydrogen generation apparatus consumes a large amount of electric energy, it is effective to use electric power as renewable energy as described above.

An apparatus that generates by-product hydrogen can also be used as the hydrogen generation apparatus. In this case, a reducing gas containing by-product hydrogen is supplied to each of reactors 4*a* and 4*b*. Examples of the apparatus that generates by-product hydrogen include, for example, an apparatus for electrolysis of an aqueous solution of sodium chloride, an apparatus for steam reforming of petroleum, an apparatus for ammonia manufacture, and the like.

In addition, the gas line GL2 may be connected to the coke oven outside the gas production device 1 via a connecting portion, and the exhaust gas from the coke oven may be used as the reducing gas. In this case, the connecting portion constitutes the reducing gas supply section. This is because the exhaust gas from the coke oven is mainly composed of hydrogen and methane, and contains 50% to 60% by volume of hydrogen.

A reducing gas heating section 11 is provided in the middle of the gas line GL2. This reducing gas heating section 11 heats the reducing gas before being supplied to the reactors 4*a* and 4*b*. By heating the reducing gas before reaction (before oxidation) in the reducing gas heating section 11 in advance, the reduction (regeneration) reaction of the reducing agent 4R by the reducing gas in the reactors 4*a* and 4*b* can be further promoted.

The reducing gas heating section 11 can be configured in the same manner as the exhaust gas heating section 10 described above. The reducing gas heating section 11 is preferably constituted by only an electric heater, only a heat exchanger, or a combination of an electric heater and a heat exchanger, and more preferably constituted by only a heat exchanger or a combination of an electric heater and a heat exchanger.

If the reducing gas heating section 11 is equipped with a heat exchanger, the heat of the high-temperature gas (for example, mixed gas) after passing through the reactors 4*a* and 4*b* is used to heat the reducing gas before being supplied to the reactors 4*a* and 4*b* by heat exchange, and thus effective use of heat can be achieved.

According to the above configuration, by switching the gas line (channel) in the gas switching section 8, for example, the exhaust gas can be supplied to the reactor 4*a* storing the reducing agent 4R before being oxidized via the gas line GL3*a*, and the reducing gas can be supplied to the reactor 4*b* storing the oxidized reducing agent 4R via a gas line GL3*b*. At this time, the reaction of Formula 1 proceeds in the reactor 4*a*, and the reaction of Formula 2 proceeds in the reactor 4*b*.

Formulas 1 and 2 show, as an example, the case where the metal oxide contained in the reducing agent 4R is iron oxide ($FeO_{x-1}$).

$$CO_2+FeO_{x-1}\rightarrow CO+FeO_x \quad \text{Formula 1:}$$

$$H_2+FeO_x\rightarrow H_2O+FeO_{x-1} \quad \text{Formula 2:}$$

Thereafter, by switching the gas line contrary to the above in the gas switching section 8, the reaction of Formula 2 can proceed in the reactor 4*a*, and the reaction of Formula 1 can proceed in the reactor 4*b*.

The reactions represented by Formulas 1 and 2 are both endothermic reactions. Therefore, the gas production device 1 preferably includes a reducing agent heating section (not shown in FIG. 1) that heats the reducing agent 4R when the exhaust gas or the reducing gas is brought into contact with the reducing agent 4R (that is, when the exhaust gas or the reducing gas reacts with the reducing agent 4R).

By providing such reducing agent heating section, the temperature in the reaction between the exhaust gas or the reducing gas and the reducing agent 4R is maintained at a high temperature, thereby a decrease in the conversion efficiency of carbon dioxide to carbon monoxide can be suitably prevented or suppressed, and the regeneration of the reducing agent 4R by the reducing gas can be further promoted.

However, depending on the type of the reducing agent 4R, the reactions shown in Formulas 1 and 2 may be exothermic reactions. In this case, the gas production device 1 preferably includes a reducing agent cooling section that cools the reducing agent 4R instead of the reducing agent heating section. By providing such reducing agent cooling section, deterioration of the reducing agent 4R during the reaction between the exhaust gas or the reducing gas and the reducing agent 4R can be suitably blocked, thereby a decrease in the conversion efficiency of carbon dioxide to carbon monoxide can be suitably prevented or suppressed, and the regeneration of the reducing agent 4R by the reducing gas can be further promoted.

In other words, in the gas production device 1, a reducing agent temperature adjustment section that adjusts the temperature of the reducing agent 4R depending on the difference of type of the reducing agent 4R (exothermic reaction or endothermic reaction) is preferably provided.

A preferred configuration of the reducing agent temperature adjustment section will be described in detail later.

Gas line GL4 is configured such that branch gas lines GL4*a* and GL4*b* are connected to the outlet ports of the reactors 4*a* and 4*b*, respectively, and are merged at a gas merging section J4. In addition, valves (not shown) are provided in the middle of the branch gas lines GL4*a* and GL4*b*, respectively, as required.

For example, by adjusting the opening of the valves, the passage speed of the exhaust gas and the reducing gas passing through the reactors 4*a* and 4*b* (that is, the treating speed of the exhaust gas with the reducing agent 4R and the treating speed of the reducing agent 4R with the reducing gas) can be set.

In this embodiment, the reaction section 4 is constituted by the reactors 4*a* and 4*b* and the gas switching section 8.

With such configuration, the gases (mainly carbon monoxide and water vapor in this embodiment) that have passed through each of the reactors 4*a* and 4*b* are mixed by being merged together in the gas merging section J4 to produce a mixed gas (merged gas), and then passes through one gas line GL4.

Therefore, by changing the channel switching state (opening/closing state of the valve) of the gas switching section 8 and performing different reactions in each of the reactors 4*a* and 4*b*, the mixed gas can be continuously manufactured, and finally the produced gas can also be manufactured continuously. In addition, since the same reaction is alternately repeated in the reactors 4*a* and 4*b*, the concentration of carbon monoxide contained in the mixed gas is stabilized, and as a result, the concentration of carbon monoxide contained in the produced gas is also stabilized.

Therefore, the gas production device 1 (gas production system 100) described above can continuously and stably manufacture carbon monoxide from carbon dioxide, which is industrially advantageous.

On the other hand, if the gas merging section J4 is not provided, it is necessary to shut off the gas switching section 8 (temporarily close the valve) when switching the gas to be supplied, each of the reactors 4*a* and 4*b* has to be batch type. Therefore, depending on the concentration of carbon dioxide in the exhaust gas, the type of reducing agent 4R, the capacity of the reactors 4*a* and 4*b*, and the like, the manufacture time of carbon monoxide becomes long, and the conversion efficiency is poor, which may be industrially disadvantageous.

In addition, the components of the gases discharged from the reactors 4*a* and 4*b* tend to change each time the gas to be supplied is switched. Therefore, the post-treatment step of the gas discharged from each reactor 4*a* and 4*b* may become complicated.

Here, the concentration of carbon monoxide contained in the mixed gas is typically preferably adjusted within a specific range (predetermined % by volume with respect to the entire mixed gas). If this concentration is too low, it tends to be difficult to obtain a produced gas containing a high concentration of carbon monoxide, depending on the performance of the gas purification section 9, which will be described later. On the other hand, even if the concentration exceeds the upper limit, the effect of further increasing the concentration of carbon monoxide contained in the finally obtained produced gas cannot be expected to increase any further.

A produced gas discharge section 40 that discharges the produced gas to the outside of the gas production device 1 is connected to the end of the gas line GL4 opposite to the reactors 4*a* and 4*b*.

A gas purification section 9 is provided in the middle of the gas line GL4.

In the gas purification section 9, carbon monoxide is purified from the mixed gas and a produced gas containing high-concentration carbon monoxide is recovered. If the concentration of the carbon monoxide in the mixed gas is sufficiently high, the gas purification section 9 may be omitted.

Such gas purification section 9 can be constituted by, for example, at least one treater selected from coolers, gas-liquid separators, gas separators, separation membranes, and scrubbers (absorption towers).

In a case where a plurality of treaters are used, their arrangement order is arbitrary, but in a case where a cooler, a gas-liquid separator, and a gas separator are used in combination, they are preferably arranged in this order. In this case, the efficiency of purifying carbon monoxide from the mixed gas can be further improved.

A cooler cools the mixed gas. This produces condensed water (liquid).

Such cooler can be configured to include a jacket type cooling apparatus in which a jacket for passing a refrigerant around the pipe is arranged, multi-tubular cooling apparatus that has the same configuration as the reactors 4*a* and 4*b* (see FIG. 2), and that passes the mixed gas within the tubular body, and a refrigerant around the tubular body, respectively, an air fin cooler, or the like.

The gas-liquid separator separates the condensed water generated when the mixed gas is cooled by the cooler, from the mixed gas. At this time, the condensed water has the advantage of being able to dissolve and remove unnecessary gas components (particularly carbon dioxide) remaining in the mixed gas.

The gas-liquid separator can be configured in the same manner as the gas-liquid separator of the minor component removal section 7, and preferably can be configured as a simple container. In this case, a filter may be arranged at the gas-liquid interface in the container to allow passage of gas but block passage of liquid.

Also, in this case, a liquid line may be connected to the bottom of the container, and a valve may be provided in the middle of the line. According to such configuration, the condensed water stored in the container can be discharged (released) out of the gas production device 1 via the liquid line by opening the valve.

Furthermore, it is preferable to provide a drain trap on the downstream side of the valve in the middle of the liquid line. As a result, even if the valve malfunctions and carbon monoxide or hydrogen flows out into the liquid line, the carbon monoxide or hydrogen is stored in the drain trap, which prevents the carbon monoxide or hydrogen from being discharged outside the gas production device 1. In place of this drain trap, or together with the drain trap, a malfunction detection function of the valve and a redundancy measure when the valve malfunctions may be provided.

The discharged condensed water may be reused by connecting the liquid line to a tank 30 described above.

Gas separators can be configured to include, for example, one or two or more of a low-temperature (deep cooling) separator, a pressure swing adsorption (PSA) separator, a membrane separation separator, a temperature swing adsorption (TSA) separator, a separator using a porous coordination polymer (PCP) obtained by conjugating a metal ion (for example, copper ions) and organic ligands (for example, 5-azidoisophthalic acid), a separator using amine absorption.

A valve may be provided between the gas-liquid separator and the gas separator of the gas line GL4. In this case, the treating speed of the mixed gas (manufacture speed of produced gas) can be adjusted by adjusting the opening of the valve.

In this embodiment, the concentration of carbon monoxide contained in the mixed gas discharged from the gas-liquid separator is 75% to 90% by volume with respect to the entire mixed gas.

Therefore, in fields where produced gas containing carbon monoxide at a relatively low concentration (75% to 90% by volume) can be used, carbon monoxide can be supplied as it is to the next step without purifying carbon monoxide from the mixed gas. That is, the gas separator can be omitted.

Examples of such fields include, for example, the field of synthesizing valuable substances (for example, ethanol and the like) from the produced gas by fermentation with microorganisms (for example, clostridium and the like), the field of manufacturing steel using the produced gas as a fuel or reducing agent, the field of manufacturing electric devices, and the field of synthesizing chemicals (phosgene, acetic acid, and the like) using carbon monoxide as a synthetic raw material.

On the other hand, in fields where it is necessary to utilize a produced gas containing relatively high concentrations (greater than 90% by volume) of carbon monoxide, the carbon monoxide is purified from the mixed gas to obtain a produced gas containing high concentrations of carbon monoxide.

Examples of such fields include, for example, the field of using produced gas as a reducing agent (blast furnace), the field of thermal power generation using produced gas as fuel, the field of manufacturing chemicals using produced gas as a raw material, and the field of fuel cells using produced gas as fuel.

Next, the usage method (action) of the gas production system 100 will be described.

[1] First, by switching the gas line (channel) in the gas switching section 8, the connecting portion 2 and the reactor 4*a* are communicated, and the reducing gas supply section 3 and the reactor 4*b* are communicated.

[2] Next, in this state, the supply of exhaust gas from the furnace 20 via the connecting portion 2 is started.

The exhaust gas supplied from the furnace 20 is typically at a high temperature of 50° C. to 300° C., but cooled to 30° C. to 50° C. before reaching the concentration adjustment section 5.

[3] Next, the exhaust gas passes through the oxygen removal apparatus (concentration adjustment section 5). Oxygen is thereby removed from the exhaust gas, and the concentration of carbon dioxide contained in the exhaust gas increases.

[4] Next, the exhaust gas passes through the compression section 6. This increases the pressure of the exhaust gas.

[5] Next, the exhaust gas passes through the minor component removal section 7. As a result, the condensed water generated when the exhaust gas is compressed in the compression section 6 and the inactivating components that reduce the activity of the reducing agent 4R are removed from the exhaust gas.

[6] Next, the exhaust gas passes through the exhaust gas heating section 10. This heats the exhaust gas.

[7] Next, the exhaust gas is supplied to the reactor 4*a*. In the reactor 4*a*, the carbon dioxide in the exhaust gas is reduced to carbon monoxide by the reducing agent 4R. At this time, the reducing agent 4R is oxidized.

The heating temperature of the exhaust gas in the above step [6] is preferably 300° C. to 700° C., more preferably 450° C. to 700° C., even more preferably 600° C. to 700° C., and particularly preferably 650° C. to 700° C. If the heating temperature of the exhaust gas is set within the above range, for example, a rapid temperature drop of the reducing agent 4R due to an endothermic reaction during conversion of carbon dioxide to carbon monoxide can be prevented or suppressed, and thus the reduction reaction of carbon dioxide in the reactor 4*a* can proceed more smoothly.

[8] In parallel with the above steps [2] to [7], water (reducing gas raw material) is supplied from the tank 30 to the hydrogen generation apparatus (reducing gas supply section 3) to produce hydrogen from water.

[9] Next, the reducing gas containing hydrogen passes through the reducing gas heating section 11. This heats the reducing gas.

[10] Next, the reducing gas is supplied to the reactor 4*b*. In the reactor 4*b*, the reducing agent 4R in oxidized state is reduced (regenerated) by the reducing gas (hydrogen).

The heating temperature of the reducing gas in the above step [9] is preferably 300° C. to 700° C., more preferably 450° C. to 700° C., even more preferably 600° C. to 700° C., and particularly preferably 650° C. to 700° C. If the heating temperature of the reducing gas is set within the above range, for example, a rapid temperature drop of the reducing agent 4R due to an endothermic reaction during reduction (regeneration) of the reducing agent 4R in an oxidized state can be prevented or suppressed, and thus the reduction reaction of the reducing agent 4R in the reactor 4*b* can proceed more smoothly.

Here, in a case of defining the heating temperature of the exhaust gas by the exhaust gas heating section 10 as X [° C.] and the heating temperature of the reducing gas by the reducing gas heating section 11 as Y [° C.], a relationship as $|X-Y|$ (that is, absolute value of difference between X and Y) ranges from 0 to 25 is preferably satisfied, a relationship as $|X-Y|$ ranges from 0 to 20 is more preferably satisfied, and a relationship as $|X-Y|$ ranges from 0 to 15 is even more preferably satisfied. In other words, the heating temperature X of the exhaust gas and the heating temperature Y of the reducing gas may be the same or slightly different. By setting X and Y to satisfy the above relationship, the conversion of carbon dioxide to carbon monoxide and the reduction of the reducing agent 4R by the reducing gas can proceed in good balance.

In a case where the heating temperature X of the exhaust gas and the heating temperature Y of the reducing gas are different, the amount of heat required for the reduction reaction of the reducing agent 4R by the reducing gas tends to be greater than the amount of heat required for the reduction reaction of carbon dioxide by the reducing agent 4R, and thus it is preferable to set the heating temperature Y of the reducing gas higher than the heating temperature X of the exhaust gas.

In this embodiment, the switching timing of the gas lines in the gas switching section 8 (that is, the switching timing of the exhaust gas and the reducing gas supplied to the reactors 4*a* and 4*b*) is preferably determined by condition I: when a predetermined amount of the exhaust gas is supplied to the reactor 4*a* or 4*b*, or Condition II: when the conversion efficiency of carbon dioxide to carbon monoxide falls below a predetermined value. As a result, since the reactors 4*a* and 4*b* are switched before the conversion efficiency of carbon dioxide to carbon monoxide drops significantly, the concentration of carbon monoxide contained in the mixed gas is increased and stabilized.

For the detection of condition II, gas concentration sensors may be arranged near the inlet and outlet ports of the reactors 4*a* and 4*b*, respectively. Based on the detected value of this gas concentration sensor, the conversion efficiency of carbon dioxide to carbon monoxide can be obtained by calculation.

In addition, from the viewpoint of further stabilizing the concentration of carbon monoxide contained in the mixed gas, the amount of exhaust gas supplied to the reactors 4*a* and 4*b* and the amount of reducing gas supplied to the reactors 4*a* and 4*b* is preferably set as close as possible. Specifically, in a case of defining the amount of the exhaust gas supplied to the reactors 4*a* and 4*b* as P [mL/min], and the amount of the reducing gas supplied to the reactors 4*a* and 4*b* as Q [mL/min], a relationship as P/Q ranges from 0.9 to 2 is preferably satisfied, and a relationship as P/Q ranges from 0.95 to 1.5 is more preferably satisfied. If the amount of the exhaust gas supplied is too large, the amount of carbon dioxide discharged from the reactors 4*a* and 4*b* tends to increase without being converted to carbon monoxide, depending on the amount of the reducing agent 4R in the reactors 4*a* and 4*b*.

The predetermined amount in the above condition I is preferably an amount of carbon dioxide of 0.01 to 3 mols, more preferably an amount of 0.1 to 2.5 mols, per 1 mol of the metal element that accounts for the largest mass ratio in the reducing agent 4R.

In addition, the predetermined value in Condition II is preferably 50% to 100%, more preferably 60% to 100%, and even more preferably 70% to 100%. The upper limit of the predetermined value may be 95% or less, or 90% or less.

In either case, it is possible to switch the reactors 4*a* and 4*b* before the conversion efficiency of carbon dioxide to carbon monoxide drops extremely, and as a result, the mixed gas containing a high concentration of carbon monoxide can be stably obtained, and thus the produced gas containing a high concentration of carbon monoxide can be manufactured.

The amount Q of the reducing gas (reducing substance) supplied is preferably an amount of hydrogen of 0.1 to 3 mols, more preferably an amount of 0.15 to 2.5 mols, per 1 mol of the metal element that accounts for the largest mass ratio in the reducing agent 4R. Even if the amount Q of the reducing gas supplied is increased beyond the upper limit, no further increase in the effect of reducing the reducing agent 4R in the oxidized state can be expected. On the other hand, if the amount Q of the reducing gas supplied is too small, the reduction of the reducing agent 4R may be insufficient depending on the amount of hydrogen contained in the reducing gas.

The pressure of the reducing gas supplied to the reactors 4*a* and 4*b* may be atmospheric pressure or pressurized (same as the exhaust gas).

[11] Next, the gases that have passed through the reactors 4*a* and 4*b* were merged together to produce a mixed gas. At this time, the temperature of the mixed gas is typically 600° C. to 650° C. If the temperature of the mixed gas at this time is within the above range, it means that the temperature in the reactors 4*a* and 4*b* is maintained at a sufficiently high temperature, and it can be determined that the conversion of carbon dioxide to carbon monoxide by the reducing agent 4R, or the reduction of the reducing agent 4R by the reducing gas proceeds efficiently.

[12] Next, the mixed gas is cooled to 100° C. to 300° C. before reaching the gas purification section 9.

[13] Next, the mixed gas passes through the gas purification section 9. As a result, for example, the produced condensed water, carbon dioxide dissolved in the condensed water, and the like are removed. As a result, carbon monoxide is purified from the mixed gas to obtain a produced gas containing a high concentration of carbon monoxide.

The temperature of the produced gas obtained is 20° C. to 50° C.

[14] Next, the produced gas is discharged from the produced gas discharge section 40 to the outside of the gas production device 1 and subjected to the next step.

<Configuration of Reducing Agent Heating Section (Reducing Agent Temperature Adjustment Section)>

Figure 4:
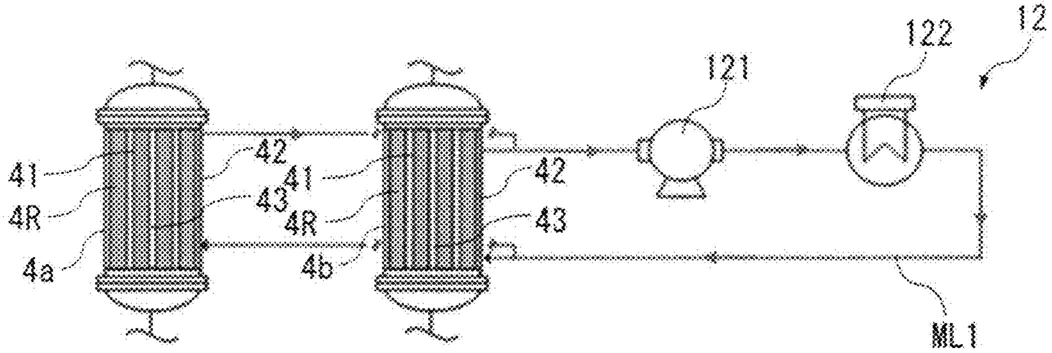
FIG. 4 is a schematic diagram showing a configuration of the reducing agent heating section.
Figure 5:
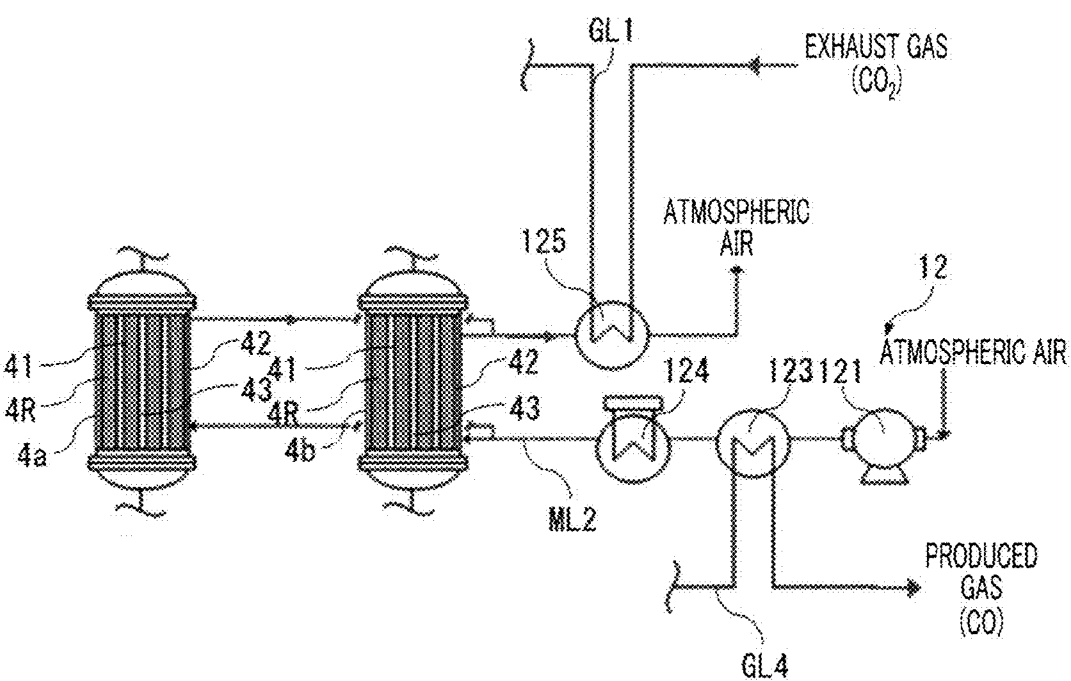
FIG. 5 is a schematic diagram showing another configuration of the reducing agent heating section.

FIG. 4 is a schematic diagram showing the configuration of the reducing agent heating section, and FIG. 5 is a schematic diagram showing another configuration of the reducing agent heating section.

The reducing agent heating section 12 shown in FIG. 4 includes a medium supplied to a space 43 defined by a plurality of tubular bodies 41 and a housing 42 in the multi-tubular reactors 4*a* and 4*b* shown in FIG. 2, a transfer apparatus 121 that transfers the medium to the space 43, and a heating apparatus 122 that heats the medium.

The reducing agent heating section 12 of this configuration example includes a circulating medium line ML1 connected to each of the reactors 4*a* and 4*b*, and the medium line ML1 is filled with the medium. The medium line ML1 is branched on the way, connected to the respective reactors 4*a* and 4*b*, and then merged again into one. In addition, a transfer apparatus 121 and a heating apparatus 122 are arranged in the middle of the merged medium line ML1.

According to such configuration, the medium heated by the heating apparatus 122 is supplied to the space 43 of the reactors 4*a* and 4*b* when circulating through the medium line ML1. As a result, the reducing agent 4R is indirectly heated via the tubular body 41. Also, the heating temperature of the reducing agent 4R in the two reactors 4*a* and 4*b* can be set substantially equal.

The heating temperature of the reducing agent 4R is preferably 300° C. to 700° C., more preferably 650° C. to 700° C. If the heating temperature is too high, the reducing agent 4R tends to deteriorate and its activity tends to decrease, depending on the type of metal oxide that composes the reducing agent 4R. On the other hand, if the heating temperature is too low, it tends to take a long time to manufacture a produced gas containing carbon monoxide at a high concentration.

Examples of the medium include gases, liquids (including viscous liquids), and the like.

The heating apparatus 122 can be constituted by only an electric heater, or can be constituted by an electric heater and a heat exchanger, similar to that described for the exhaust gas heating section 10.

According to the latter configuration, the heat of the high-temperature gas after passing through the reactors 4*a* and 4*b* is used to heat the medium before being supplied to the reactors 4*a* and 4*b* by heat exchange and thus effective use of heat can be achieved.

In a case of using a gas as the medium, the transfer apparatus 121 can be constituted by a blower. In addition, in a case of using a liquid as a medium, the transfer apparatus 121 can be constituted by a pump.

The reducing agent heating section 12 can also be constituted by an electric heater instead of configuration using a medium (heated gas). In this case, the heating by the electric heater may be performed on the housings 42 of the reactors 4*a* and 4*b*, or may be performed separately on the tubular body 41 filled with the reducing agent 4R.

The reducing agent heating section 12 shown in FIG. 5 includes a non-circulating medium line ML2 and is configured to use atmospheric air (gas) as a medium.

In this configuration example, a transfer apparatus 121 (blower), a first heat exchanger 123, and a heating apparatus 124 constituted by an electric heater are arranged in order from the atmospheric air supply port side of the medium line ML2, and a second heat exchanger 125 is arranged on the atmospheric air exhaust port side.

It is preferable that the first heat exchanger 123 and the second heat exchanger 125 each have the same configuration as the heat exchanger 102.

The first heat exchanger 123 exchanges heat between the gas (for example, mixed gas) after passing through within the tubular body 41 of the reactors 4*a* and 4*b* and the atmospheric air before being supplied to the space 43 of the reactors 4*a* and 4*b*. On the other hand, the second heat exchanger 125 exchanges heat between the atmospheric air after passing through the space 43 of the reactors 4*a* and 4*b* and the exhaust gas before being supplied to the reactors 4*a* and 4*b*.

The heat of the high-temperature gas or atmospheric air (medium) after passing through the reactors 4*a* and 4*b* is used to heat the atmospheric air (medium) or exhaust gas before being supplied to the reactors 4*a* and 4*b* by heat exchange and thus effective use of heat can be achieved.

The second heat exchanger 125 may employ a configuration for exchanging heat with the reducing gas before being supplied to the reactors 4*a* and 4*b* instead of the configuration for exchanging heat with the exhaust gas before being supplied to the reactors 4*a* and 4*b*, and may employ a configuration for exchanging heat with both the exhaust gas and the reducing gas before being supplied to the reactors 4*a* and 4*b*.

In addition, according to the configuration example shown in FIG. 5, the temperature of the medium in contact with the transfer apparatus 121 is lower than in the configuration example shown in FIG. 4, and thus there is an advantage in that even a transfer apparatus that is relatively inexpensive and has low heat resistance can be used.

Here, in a case where a combustion furnace or the like is used to heat the reactors 4*a* and 4*b* (reducing agent 4R), it is necessary to combust fuel to maintain the heating temperature (reaction temperature) of the reducing agent 4R. As a result, carbon dioxide is generated and must be released into the atmosphere.

On the other hand, by configuring the reducing agent heating section 12 as shown in FIGS. 4 and 5, as power source of transfer apparatus 121 and heating apparatus 122 and 124, electric power (electric energy) as renewable energy as described above can be used, and thus the load on the environment can be reduced.

There is also the advantage that the possibility of ignition of the combustible gas present in the gas production device 1 can be more reliably reduced.

In place of the configuration as shown in FIGS. 4 and 5, the reducing agent heating section may be configured to include an irradiation apparatus for irradiating the reducing agent 4R with a microwave.

According to the configuration in which the reducing agent 4R is heated by microwave irradiation, the reducing agent 4R can be heated to the target temperature in a relatively short time. In addition, it is easy to uniformly heat not only the vicinity of the surface of the reducing agent 4R but also the central portion. Furthermore, it is easy to precisely control the heating temperature of the reducing agent 4R. Therefore, by using the irradiation apparatus, the manufacture efficiency of the produced gas can be further improved. In addition, such irradiation apparatus can be made smaller than the configurations shown in FIGS. 4 and 5.

Further, in the case of microwave irradiation, only the vicinity of the surface of the reducing agent 4R can be locally (preferentially) raised to the target temperature. Therefore, in a case where the reaction proceeds at a high temperature (in the case of an endothermic reaction), it is easy to increase the efficiency. In this case, the energy efficiency is also improved because it is only necessary to input energy to raise the temperature only in the vicinity of the surface of the reducing agent 4R.

Microwave means electromagnetic waves with a frequency of 300 MHz to 300 GHz, and is classified as ultra high frequency (UHF) with a frequency of 300 to 3000 MHz, super high frequency (SHF) with a frequency of 3 to 30 GHz, and extremely high frequency (EHF) with a frequency of 30 to 300 GHz. Among them, ultra high frequency (UHF) is preferable as the microwave. By using ultra high frequency (UHF), the reducing agent 4R can be heated to the target temperature in a shorter time. In a case of irradiating with a microwave, appropriate countermeasures against leakage of radio waves are performed in conformity with the Radio Law.

In addition, the microwave irradiation may be performed continuously or intermittently (pulse-like).

The present inventors have found that continuous microwave irradiation further increases the conversion efficiency of carbon dioxide to carbon monoxide and the regeneration (reduction) efficiency of the reducing agent 4R by the reducing gas. The reason is not necessarily clear, but it is considered to be a factor that the carbon dioxide contained in the exhaust gas supplied to the reactors 4*a* and 4*b*, the hydrogen contained in the reducing gas, and the reducing agent 4R are activated by continuous microwave irradiation.

On the other hand, in a case where microwave irradiation is performed intermittently, microwaves may be irradiated at predetermined timing to compensate for the amount of energy required only for the endothermic reaction during the conversion of carbon dioxide to carbon monoxide and the regeneration (reduction) of the reducing agent 4R by the reducing gas, and thus the energy efficiency can be improved.

In the case of heating by microwave irradiation, the heating temperature of the exhaust gas, the heating temperature of the reducing gas, and the heating temperature of the reducing agent 4R may be the same range as described above, or may be different from the range described above. For example, each heating temperature described above can be set to 300° C. to 700° C.

The irradiation apparatus may be arranged inside the reactors 4*a* and 4*b*, or may be arranged outside. As described above, as long as the gas composition of the exhaust gas is deviated from the explosion range by the concentration adjustment section 5, it is possible to be suitably prevent from being an ignition source to the exhaust gas regardless of the conditions of microwave irradiation.

In addition, since electric energy is used as a power source for the irradiation apparatus, there is also an advantage of readily switching this electric energy to renewable energy.

As described above, in a case where the reaction by the reducing agent 4R is an exothermic reaction, the reducing agent temperature adjustment section can be configured as a reducing agent cooling section. In this case, for example, in the configuration shown in FIGS. 4 and 5, the first heat exchanger 123 and the second heat exchanger 125 may be omitted, and the heating apparatus 122 and 124 may be changed to cooling apparatus. Examples of the cooling apparatus include a jacket type cooling apparatus and a multi-tubular cooling apparatus. Also in this case, it is preferable to set the cooling temperature (temperature after temperature adjustment) of the reducing agent 4R to the same range as described above.

<Configuration Near Connecting Portion>

Figure 6:
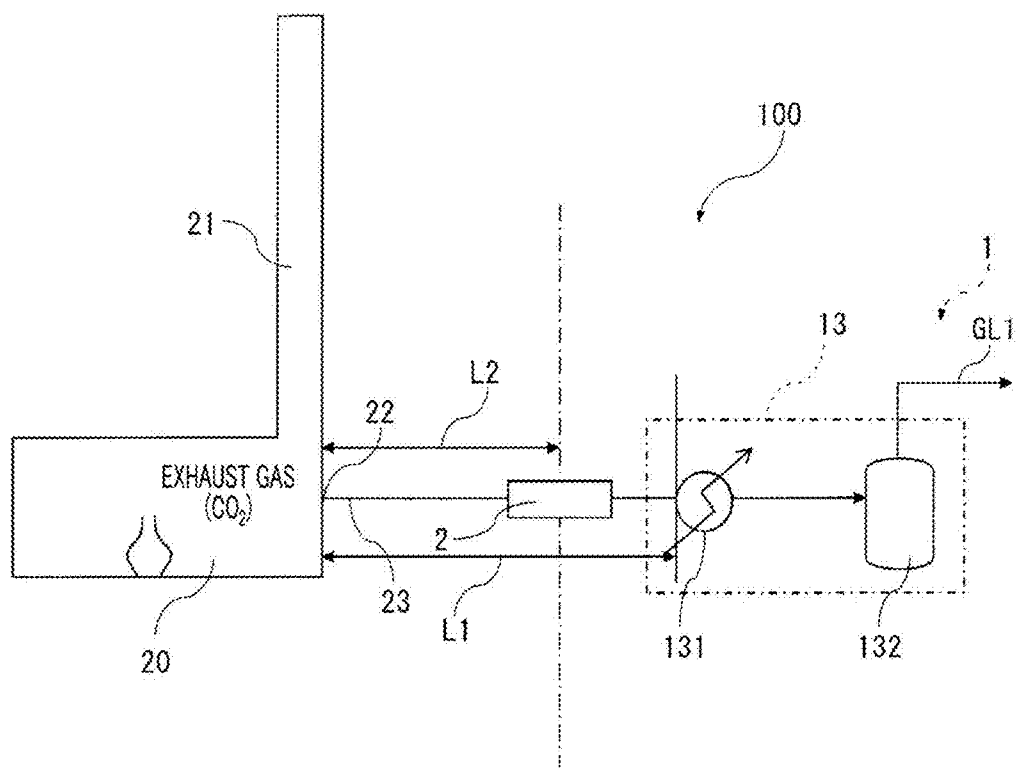
FIG. 6 is a schematic diagram showing a configuration near the connecting portion between the gas production device according to the present invention and the furnace.

FIG. 6 is a schematic diagram showing the configuration near the connecting portion (raw material gas supply section) between the gas production device according to the present invention and the furnace.

As shown in FIG. 6, the furnace 20 is provided with a chimney 21 through which exhaust gases are discharged to the atmosphere. One end of a gas line 23 is connected to a branch portion 22 in the middle of the chimney 21 in the height direction. In addition, the other end of the gas line 23 is connected to the connecting portion 2 of the gas production device 1.

In the configuration shown in FIG. 6, a cooling section 13 is provided between the connecting portion 2 and the concentration adjustment section 5. The cooling section 13 includes a cooling apparatus 131 and a container 132 connected to the cooling apparatus 131. The cooling apparatus 131 can be constituted by a jacket type cooling apparatus, a multi-tubular cooling apparatus, or the like as described above.

Since the exhaust gas supplied from the furnace 20 contains not only water vapor but also oxidizing gas components ($SO_x$, HCl, and the like), it is preferable that the cooling in the cooling section 13 condenses the water vapor together with the oxidizing gas components and the condensed water (acidic aqueous solution) in which the oxidizing gas components are dissolved is removed. Corrosion of the pipe constituting the gas line GL1 can thereby be suitably prevented.

In this configuration example, the exhaust gas is cooled by the cooling apparatus 131 to produce an acidic aqueous solution, and the acidic aqueous solution is stored in the container 132 and separated from the exhaust gas. In addition, a filter may be arranged at the gas-liquid interface in the container 132 to allow passage of gas but block passage of liquid.

In such configuration, the separation distance (L1 in FIG. 6) between the branch portion 22 and the cooling apparatus 131 is not particularly limited, but is preferably 10 m or less, more preferably 1 to 5 m. By setting the separation distance L1 within the above range, it is possible that the production of condensed water (acidic aqueous solution) in which the acid gas is dissolved at an unintended position of the gas line GL1 is blocked, and thus the corrosion of the pipes constituting the gas line GL1 can be prevented more reliably.

Further, in a case where the gas production system 100 is installed, for example, in a cold region or the like, particularly, depending on the separation distance L2 between the furnace 20 and the gas production device 1, the condensed water is produced in the middle of the gas line 23, and further may lead to freezing. This may cause damage in the pipe constituting the gas line 23.

Therefore, in order to prevent such troubles, it is preferable to heat the exhaust gas in the gas line 23. The heating temperature may be any temperature that does not cause freezing, but is preferably not less than an acid dew point temperature (for example, 120° C.), more preferably 120° C. to 150° C. It is thus possible to suitably prevent corrosion of the pipe due to the generation of condensed water in which acid gases are dissolved while preventing damage in the pipe constituting the gas line 23.

In order to heat the exhaust gas in the gas line 23, for example, a heating wire (heater) may be arranged by winding around the pipe constituting the gas line 23. In addition, in the case of anti-corrosion purposes, a resin-lined pipe or the like made of a corrosion-resistant resin material (for example, a fluorine-based resin material) may be used without using a heater.

In addition, in this configuration example, the container 132 may be omitted as necessary.

In the above-described embodiment, the exhaust gas is representatively explained as an example of the raw material gas, but as described above, the raw material gas is not particularly limited to the exhaust gas as long as it contains carbon dioxide. Therefore, in the above embodiment, various treatment conditions for the exhaust gas (including pressurization pressure by the compression section 6, heating temperature before supply to the reactors 4*a* and 4*b*, amounts of supply to the reactors 4*a* and 4*b*, and the like) can be applied similarly to other raw material gases.

Using the gas production device 1 and the gas production system 100 as described above, a produced gas containing carbon monoxide can be manufactured from a raw material gas containing carbon dioxide.

<Gas Production Method>

The gas production method according to this embodiment is a method of bringing the above-described exhaust gas (raw material gas) into contact with the above-described reducing agent 4R to manufacture a produced gas containing carbon monoxide, the gas production method including, I: preparing a plurality of reactors 4*a* and 4*b* where the reductant 4R is arranged inside, and an exhaust gas, II: bringing the exhaust gas into contact with reducing agent 4R in each of the reactors 4*a* and 4*b* to convert carbon dioxide to carbon monoxide, III: in a case of recovering the gases that have passed through the reactors 4*a* and 4*b* as it is, or by purifying the carbon monoxide from the gases that have passed through the reactors 4*a* and 4*b*, as the produced gas, adjusting the concentration of oxygen contained in the exhaust gas to less than 1% by volume before the exhaust gas is supplied to the reactors 4*a* and 4*b*.

<Products>

The produced gas manufactured using the gas production device 1 and the gas production system 100 has a carbon monoxide concentration of typically 60% by volume or more, preferably 75% by volume or more, and more preferably 90% by volume or more.

In addition, the produced gas as described above is used in the field of synthesizing valuable substances (for example, ethanol and the like) by fermentation with microorganisms (for example, clostridium and the like), the field of manufacturing steel using the produced gas as a fuel or reducing agent, the field of manufacturing electric devices, the field of manufacturing chemicals (phosgene, acetic acid, and the like) using carbon monoxide as a synthetic raw material, the field of using the produced gas as a reducing agent (blast furnace), the field of thermal power generation using the produced gas as fuel, the field of fuel cells using the produced gas as fuel, and the like.

In the reactors 4*a* and 4*b* shown in FIG. 2, when the exhaust gas comes into contact with the reducing agent 4R, carbon monoxide is produced by the reduction reaction of carbon dioxide, and at least a part of the oxygen atoms released from the carbon dioxide are captured by the reducing agent 4R. Subsequently, when the reducing gas comes into contact with the reducing agent 4R, the part of the oxygen atoms are transferred to hydrogen (reducing substance) to produce water (oxide of the reducing substance). That is, in the reactors 4*a* and 4*b* shown in FIG. 2, at least a part of the oxygen atoms can be separated within a reduction reaction system (reaction field) of the carbon dioxide.

Figure 7:
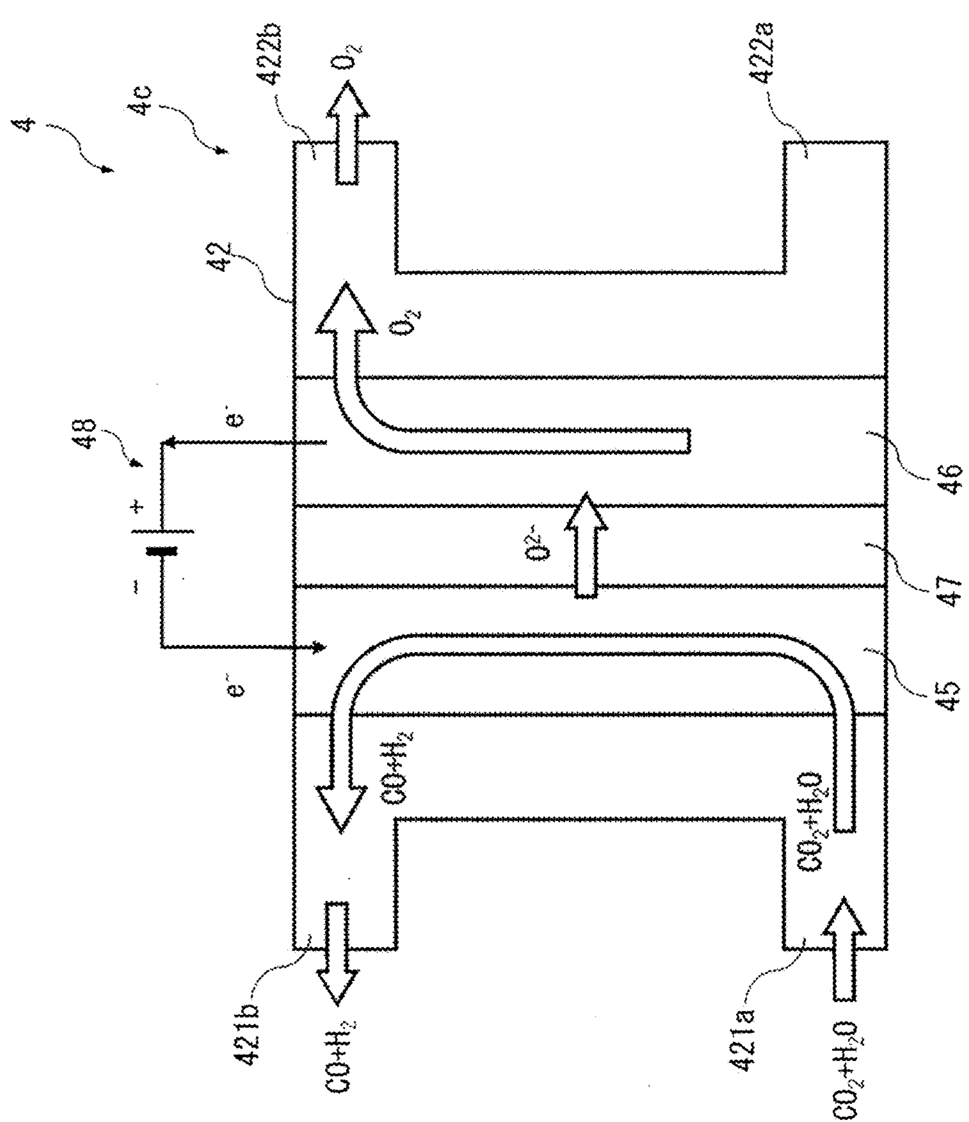
FIG. 7 is a cross-sectional view schematically showing a second configuration example of the reactor.

The configuration shown in FIG. 7 can also be employed for a reactor capable of separating at least a part of the oxygen atoms in such reduction reaction system of the carbon dioxide.

The reactors 4*a* and 4*b* shown in FIGS. 1 and 2 employ a configuration that uses the method (so-called chemical looping method) in which the reverse water gas shift reaction is divided into two reactions, the conversion reaction of carbon dioxide to carbon monoxide and the reduction reaction with hydrogen (reducing substance), and the reducing agent 4R bridges these reactions.

The reactor in the present invention may employ a configuration in which carbon dioxide is converted into carbon monoxide by electrolysis. Hereinafter, such configuration (second configuration example) will be described.

A reactor 4*c* of the second configuration example shown in FIG. 7 is a reaction apparatus that electrochemically performs a reduction reaction of carbon dioxide, and is also called a reaction cell, an electrolytic cell, or an electrochemical cell.

Reactor 4*c* has a housing 42, a cathode 45, an anode 46, a solid electrolyte layer 47, and a power source 48, the cathode 45, the anode 46, and the solid electrolyte layer 47 being provided in housing 42, the power source 48 being electrically connected to the cathode 45 and the anode 46.

In such configuration, the space within the housing 42 is partitioned right and left by a laminate of a cathode (reductant) 45, an anode 46, and a solid electrolyte layer 47.

The housing 42 includes a cathode side inlet port 421*a*, a cathode side outlet port 421*b*, an anode side inlet port 422*a*, and an anode side outlet port 422*b*. The cathode side inlet port 421*a* and the cathode side outlet port 421*b* communicate with the cathode chamber which is the space on left side within the housing 42, and the anode side inlet port 422*a* and the anode side outlet port 422*b* communicate with the anode chamber which is the space on right side within the housing 42.

The cathode 45 and the anode 46 are each composed of a conductive carrier and a catalyst supported on the carrier.

The carrier can be composed of, for example, a carbon material such as carbon fiber fabric (carbon cloth, carbon felt, and the like) or carbon paper.

In addition, examples of catalysts include platinum group metals such as platinum, ruthenium, rhodium, palladium, osmium, and iridium, transition metals such as gold, alloys of these metals, and alloys of these metals with other metals.

The solid electrolyte layer 47 can be composed of, for example, a fluorine-based polymer membrane having a sulfonic acid group (Nafion (registered trademark), and the like), a sulfo-based ion-exchange resin membrane, or the like.

It is preferable to use a power source that generates electric power as renewable energy for the power source 48. Thereby, the energy efficiency in manufacturing the produced gas can be further improved.

In such reactor 4*c*, when the exhaust gas (carbon dioxide and water vapor) is supplied from the cathode side inlet port 421*a*, the electrons supplied from the power source 48 and the action of the catalyst cause a reduction reaction of carbon dioxide and water to produce carbon monoxide and hydrogen, and oxygen ions are produced. Carbon monoxide and hydrogen are discharged from the cathode side outlet port 421*b* to the gas line (gas line GL4), and oxygen ions diffuse within the solid electrolyte layer 47 toward the anode 46. Oxygen ions that reach the anode 46 are converted into oxygen by taking away electrons and discharged from the anode side outlet port 422*b*.

In this way, at least a part of the oxygen atoms released from carbon dioxide at the cathode 45 are separated as oxygen ions in the reduction reaction system (reaction field) and converted to oxygen at the anode 46.

In addition, the reactor in the present invention may be a reaction apparatus configured such that at least a part of the oxygen atoms released from carbon dioxide by the reduction reaction are not separated in the reduction reaction system.

Examples of such reactor include an apparatus utilizing the reverse water gas shift reaction in which carbon dioxide and hydrogen are simultaneously brought into contact with the reducing agent 4R to convert carbon dioxide into carbon monoxide and convert hydrogen (reducing substance) into water (oxide of the reducing substance).

In this reactor, at least a part of the oxygen atoms released from carbon dioxide react with hydrogen to produce water without being separated from the reduction reaction system (reaction field).

However, in a case of using a reactor as described above, capable of separating at least a part of the oxygen atoms released from carbon dioxide in the reduction reaction system (reaction field), the coexistence of carbon monoxide and water that are the reaction products in the system becomes difficult, and thus a decrease in the conversion efficiency of carbon dioxide to carbon monoxide due to restrictions in chemical equilibrium can be prevented or suppressed.

The gas production system 100 (gas production device 1) described above employs a configuration that the gases that have passed through the reactors 4*a* and 4*b* are merged immediately after passing through the reactors 4*a* and 4*b*, but various treatment may be applied before merging. That is, at least one treater can be provided, for any purpose, in the middle of the branch gas lines GL4*a* and GL4*b*.

Next, the gas production system 100 having such configuration will be described.

Figure 8:
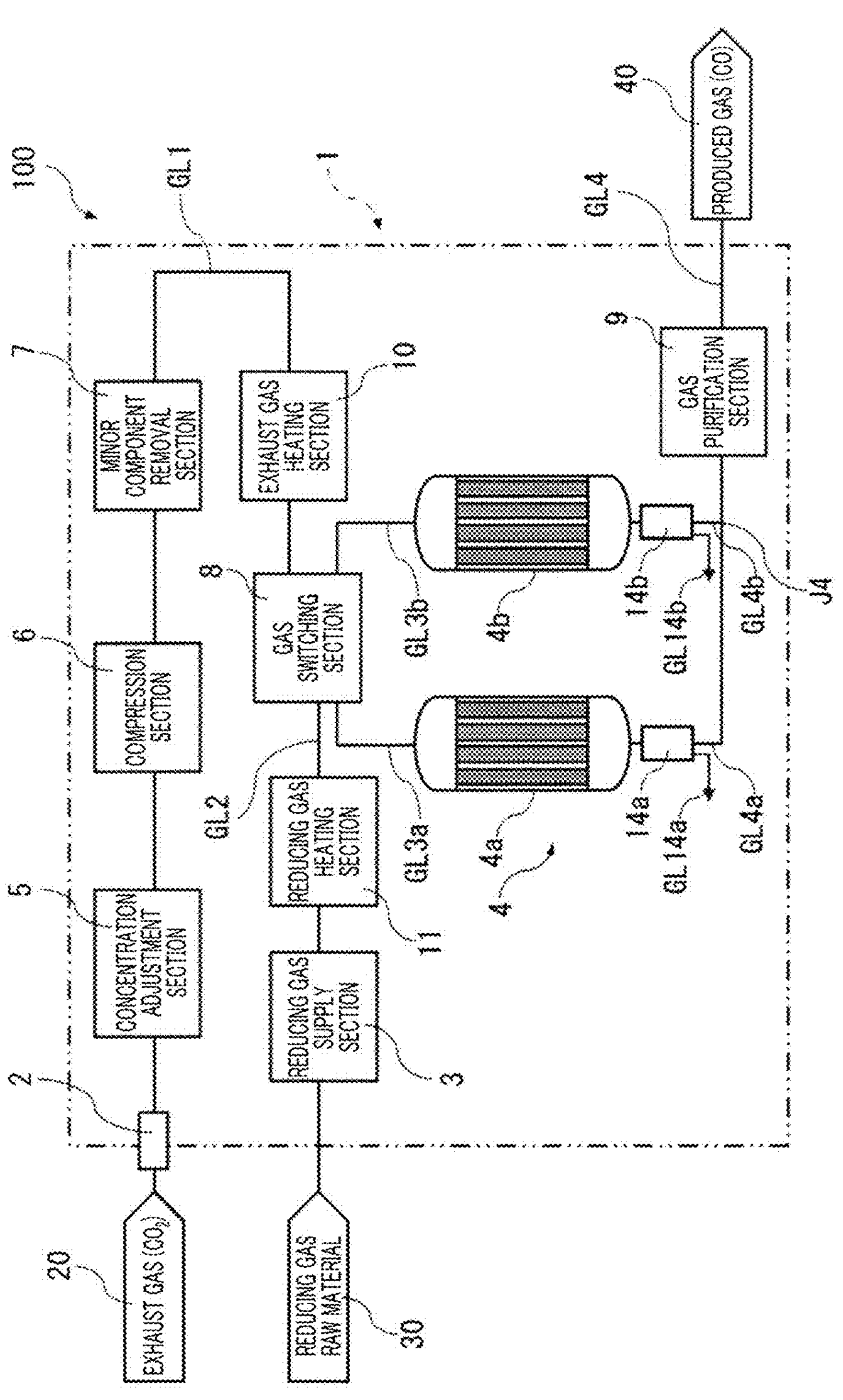
FIG. 8 is a schematic diagram showing another embodiment of the gas production system according to the present invention.
Figure 9:
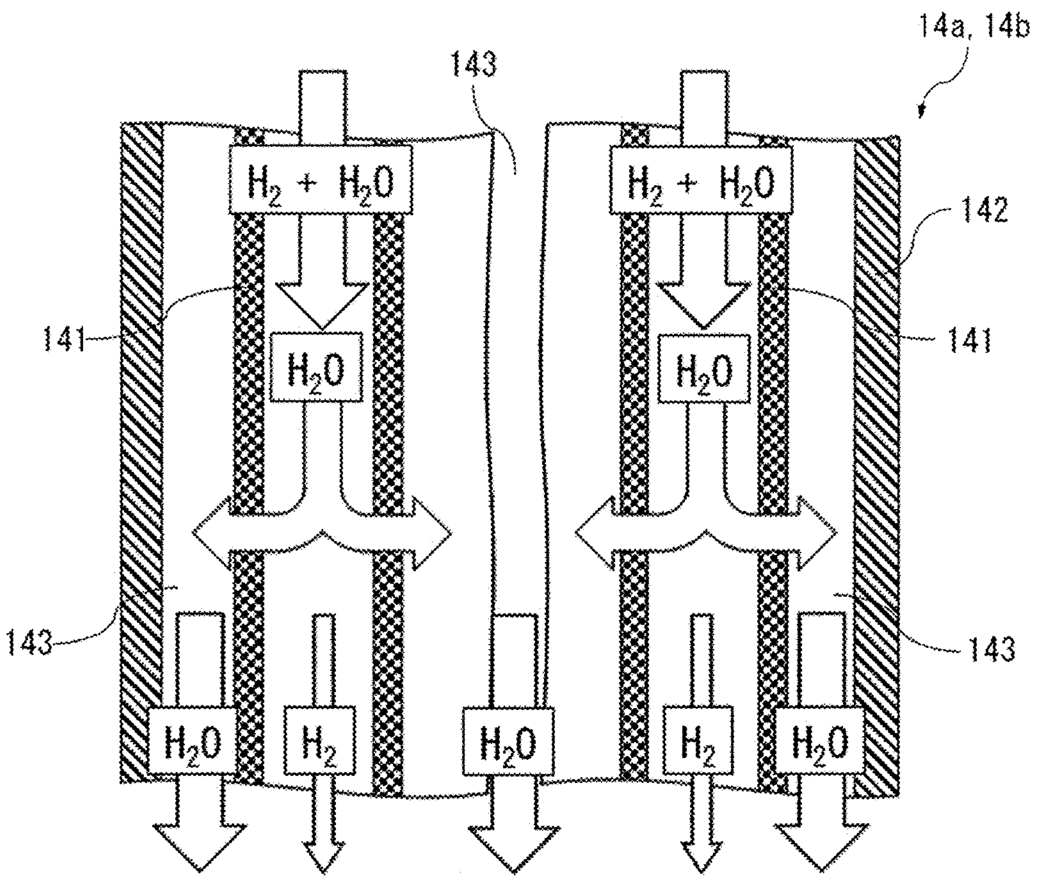
FIG. 9 is a cross-sectional view schematically showing a configuration of the purifier in FIG. 8.

FIG. 8 is a schematic diagram showing another embodiment of the gas production system according to the present invention, and FIG. 9 is a cross-sectional view schematically showing the configuration of the purifier in FIG. 8.

Hereinafter, the gas production system 100 shown in FIG. 8 will be described with a focus on differences from the gas production system 100 shown in FIG. 1, and descriptions of the same items will be omitted.

The gas production system 100 shown in FIG. 8 further includes purifiers 14*a* and 14*b* provided in the middle of the branch gas lines GL4*a* and GL4*b*. That is, each of the purifier 14*a* and 14*b* is connected to the downstream side of the corresponding reactor 4*a* and 4*b*, and the gases that have sequentially passed through the reactors 4*a* and 4*b* and the purifiers 14*a* and 14*b* are merged at the gas merging section J4.

As shown in FIG. 9, each of the purifiers 14*a* and 14*b* is configured as a multi-tubular purification apparatus including a plurality of separation cylinders 141 and a housing (purifier main body) 142 storing the plurality of separation cylinders 141. According to such multi-tubular purification apparatus, it is possible to ensure sufficient opportunities for contact between the gas that passed through the reactors 4*a* and 4*b* and the separation cylinder 141.

Each of the purifiers 14*a* and 14*b* is preferably configured such that at least one of separation of water (oxide of reducing substance) and hydrogen (reducing substance) produced by contact with the reducing agent 4R, and separation of carbon monoxide and carbon dioxide can be performed. In particular, the separation cylinder 141 is preferably configured to allow water (water vapor) or carbon monoxide to permeate through its wall and separate it from hydrogen or carbon dioxide.

In this embodiment, the water and carbon monoxide that have permeated the separation cylinder 141 are discharged from the purifiers 14*a* and 14*b* to the branch gas lines GL4*a* and GL4*b*. On the other hand, the reducing gas (unreacted hydrogen) and exhaust gas (unreacted carbon dioxide) that have passed through the separation cylinder 141 are discharged to gas lines GL14*a* and GL14*b* connected to the housing 142 (space 143).

These gas lines GL14*a* and GL14*b* may be connected in the middle of gas line GL1 and gas line GL2, respectively. Thereby, unreacted hydrogen and carbon dioxide can be reused.

The gas discharged to the branch gas lines GL4*a* and GL4*b* may contain gas components other than water or carbon monoxide, and the gas discharged to the gas lines GL14*a* and GL14*b* may also contain gas components other than hydrogen or carbon dioxide.

The separation of carbon monoxide and carbon dioxide and the separation of water and hydrogen is possible by cooling the gases discharged from the reactors 4*a* and 4*b* utilizing the difference in condensation (liquefaction) temperature. However, in this case, when the separated gas components are used in a high temperature state on the downstream side of the reactors 4*a* and 4*b* (for example, when used in the heat exchanger 102), it is necessary to heat the gas components again, and thus thermal energy is wasted. On the other hand, according to the purifiers 14*a* and 14*b*, since the separation operation of the gas components can be performed at a high temperature (for example, 200° C. to 500° C.), the temperature of the gas components after separation is less likely to decrease, which can contribute to the reduction of thermal energy in the entire manufacture of produced gas.

From the viewpoint of more reliably preventing a decrease in the temperature of the gas components after separation by the purifiers 14*a* and 14*b*, a heating apparatus that heats the separation cylinder 141 (for example, an irradiation apparatus that irradiates the above-mentioned microwave, or the like) may be provided.

As described above, relatively high temperature gas is discharged from each of reactors 4*a* and 4*b*. Therefore, the separation cylinder 141 preferably has heat resistance. As a result, alteration and deterioration of the separation cylinder 141 can be prevented.

Such separation cylinder 141 is preferably composed of metal, inorganic oxide, or metal organic frameworks (MOF). In this case, it is easy to impart excellent heat resistance to the separation cylinder 141. Examples of metals include titanium, aluminum, copper, nickel, chromium, cobalt, and alloys containing these. Examples of inorganic oxides include silica and zeolite. Examples of the metal organic frameworks include a framework of zinc nitrate hydrate and terephthalate dianion, a framework of copper nitrate hydrate and trimesate trianion, and the like. In a case of using metal, the separation cylinder 141 is preferably composed of a porous material having a porosity of 80% or more.

The separation cylinder 141 is preferably composed of a porous body including continuous pores (pores penetrating the cylinder wall) in which adjacent pores communicate with each other. With the separation cylinder 141 having such configuration, the permeability of water or carbon monoxide can be increased, and the separation of water and hydrogen, and/or the separation of carbon monoxide and carbon dioxide can be performed more smoothly and reliably.

The porosity of the separation cylinder 141 is not particularly limited, but is preferably 5% to 95%, more preferably 10% to 90%, and even more preferably 20% to 60%. As a result, the mechanical strength of the separation cylinder 141 can be prevented from being extremely lowered, and the permeability of water or carbon monoxide can be maintained sufficiently high.

The shape of the separation cylinder 141 is not particularly limited, and examples of the shape include a circle-cylindrical shape and an angular-cylindrical shape such as a square cylinder shape and a hexagonal cylinder shape.

It is effective to remove unreacted hydrogen from the viewpoint of improving the handleability of the gas after merging at the gas merging section J4 (preventing ignition) and maintaining high manufacture efficiency of the produced gas.

That is, as shown in FIG. 9, it is preferably configured that water is moved from the hydrogen ($H_2$) and water ($H_2O$) that have passed through the reactors 4*a* and 4*b* to the space 143 within the housing 142 via the separation cylinder 141.

In this case, the average pore diameter of the separation cylinders 141 is preferably 600 μm or less, and more preferably 400 to 500 μm. Thereby, the separation efficiency between water and hydrogen can be further improved.

The space 143 within the housing 142 may be depressurized, or may be made to pass a carrier gas (sweep gas). Examples of carrier gases include inert gases such as helium and argon.

In addition, it is preferable that the separation cylinder 141 has hydrophilicity. In a case where the separation cylinder 141 has hydrophilicity, the affinity of water for the separation cylinder 141 increases, and water easily permeates the separation cylinder 141 more smoothly.

Examples of methods for imparting hydrophilicity to the separation cylinder 141 include a method for improving the polarity of the separation cylinder 141 by changing the ratio of metal elements in the inorganic oxide (for example, increasing the Al/Si ratio), a method for coating the separation cylinder 141 with a hydrophilic polymer, a method of treating the separation cylinder 141 with a coupling agent having a hydrophilic group (polar group), and a method of subjecting the separation cylinder 141 to plasma treatment, corona discharge treatment, or the like.

Furthermore, the affinity of the separation cylinder 141 for water may be controlled by adjusting the surface potential of the separation cylinder 141.

On the other hand, in a case where the separation of carbon monoxide and carbon dioxide is preferentially performed in the separation cylinder 141, and a case where both the separation of water and hydrogen, and the separation of carbon monoxide and carbon dioxide are performed simultaneously in the separation cylinder, the constituent material, the porosity, the average pore diameter, the degree of hydrophilicity or hydrophobicity, the surface potential, and the like of separation cylinder 141 may be appropriately combined and set.

The purifier may be provided in the middle of the gas line GL4 and between the gas merging section J4 and the gas purification section 9.

In addition, in a case where the purifiers 14*a* and 14*b* are provided, the gas purification section 9 may be omitted.

Although the gas production device, gas production system, and gas production method according to the present invention have been described above, the present invention is not limited to these.

For example, the gas production device and gas production system according to the present invention may each have any additional configuration to the above embodiments, and may be replaced with any configuration that exhibits similar functions, and a part of the configuration may be omitted.

In addition, in the gas production method according to the present invention, a step for any purpose may be added to the above-described embodiment.

In addition, the reactors 4*a* and 4*b* may be configured by moving bed type reactors instead of fixed bed type reactors. In this case, the two reactors 4*a* and 4*b* can be connected to each other at the top and bottom, and the reducing agent 4R can be moved (can be circulated) between the reactors 4*a* and 4*b*.

In this case, the gas line GL1 may be connected to one inlet port of the reactors 4*a* and 4*b* without branching, and the gas line GL2 may also be connected to the other inlet port of the reactors 4*a* and 4*b* without branching.

In addition, in this case, one of the reactors 4*a* and 4*b* is configured as a vertical counter-current type reactor, and the other is configured as a vertical co-current type reactor. Both of the reactors 4*a* and 4*b* may be configured as cross-current type reactors.

In addition, in the above embodiments, a gas containing hydrogen was described as a representative of the reducing gas, but the reducing gas may be used a gas at least one selected from hydrocarbons (for example, methane, ethane, acetylene, and the like) and ammonia, instead of or in addition to hydrogen as a reducing substance.

Furthermore, in the above embodiment, a heat exchanger configured to exchange heat between the exhaust gas (raw material gas), the reducing gas, or the heating medium before being supplied to the reactor and the mixed gas was described, but a heat exchanger configured to exchange heat with the gas discharged from the reactor and before being mixed gas may be employed.

In addition, the gas merging section J4 may be omitted and the branch gas lines GL4*a* and GL4*b* may be employed as independent gas lines. In this case, the gas (water or carbon monoxide) after passing through the each of reactors 4*a* and 4*b* is transferred through branch gas lines GL4*a* and GL4*b* independent of each other. For example, a gas containing water (water vapor) is subjected to disposal treatment or conversion treatment to the tank 30, and a gas containing carbon monoxide is subjected to purification treatment as necessary and then subjected to subsequent treatment. According to such configuration, the gas after passing through the each of reactors 4*a* and 4*b* can be treated independently of each other.

EXPLANATION OF REFERENCES

100: Gas production system
1: Gas production device
2: Connecting portion
3: Reducing gas supply section
4: Reaction section
4*a*, 4*b*: Reactor
41: Tubular body, 42: Housing, 43: Space, 4R: Reducing agent
4*c*: Reactor
421*a*: Cathode side inlet port, 421*b*: Cathode side outlet port,
422*a*: Anode side inlet port, 422*b*: Anode side outlet port,
45: Cathode, 46: Anode, 47: Solid electrolyte layer, 48: Power source
5: Concentration adjustment section
6: Compression section
7: Minor component removal section
8: Gas switching section
9: Gas purification section
10: Exhaust gas heating section
101: Electric heater, 102: Heat exchanger
11: Reducing gas heating section
12: Reducing agent heating section
121: Transfer apparatus, 122: Heating apparatus, 123: First heat exchanger, 124: Heating apparatus,
125: Second heat exchanger
13: Cooling section
131: Cooling apparatus, 132: Container
14*a*, 14*b*: Purifier
141: Separation cylinder, 142: Housing, 143: Space
20: Furnace
21: Chimney, 22: Branch portion, 23: Gas line
30: Tank
40: Produced gas discharge section
GL1: Gas line
GL2: Gas line
GL3*a*, GL3*b*: Gas line
GL4: Gas line
GL4*a*, GL4*b*: Branch gas line, J4: Gas merging section
GL14*a*, GL14*b*: Gas line
L1: Separation distance
L2: Separation distance

The invention claimed is:

1. A gas production device that manufactures a produced gas containing carbon monoxide by bringing a raw material gas containing carbon dioxide into contact with a reductant that reduces the carbon dioxide, the gas production device comprising:
a raw material gas supply section that supplies the raw material gas;
a reaction section that is connected to the raw material gas supply section and that includes at least one reactor storing the reductant; and
a concentration adjustment section that is provided between the raw material gas supply section and the at least one reactor, and that adjusts a concentration of oxygen contained in the raw material gas,
wherein in the concentration adjustment section, the concentration of the oxygen contained in the raw material gas is adjusted to less than 1% by volume.

2. The gas production device according to claim 1,
wherein the concentration adjustment section includes an oxygen removal apparatus that removes the oxygen contained in the raw material gas.

3. The gas production device according to claim 1,
wherein the at least one reactor stores the reductant that produces the carbon monoxide by a reduction reaction of the carbon dioxide caused by contact with the raw material gas, and is capable of separating at least a part of oxygen atoms released from the carbon dioxide, in the system of the reduction reaction.

4. The gas production device according to claim 3,
wherein the at least one reactor includes a plurality of reactors that store a reducing agent as the reductant, where the reducing agent contains a metal oxide that reduces carbon dioxide,
the gas production device further comprises a reducing gas supply section that supplies a reducing gas containing a reducing substance that reduces the reducing agent oxidized by contact with the carbon dioxide,
each of the reactors is connected to at least one of the raw material gas supply section and the reducing gas supply section, where the raw material gas and the reducing gas to be supplied to each of the reactors are switchable or the reducing agent is movable between the reactors.

5. The gas production device according to claim 4, further comprising a gas merging section that produces a mixed gas by merging gases that have passed through the at least one reactor that includes a plurality of reactors.

6. The gas production device according to claim 4, further comprising gas lines independent from each other, which are connected to the respective reactors of the at least one reactor that includes a plurality of reactors.

7. The gas production device according to claim 4,
wherein the metal oxide contains at least one selected from metal elements belonging to the groups 3 to 12.

* * * * *